(12) United States Patent
Jung et al.

(10) Patent No.: US 11,469,861 B2
(45) Date of Patent: Oct. 11, 2022

(54) METHOD AND APPARATUS FOR PERFORMING RETRANSMISSION IN NR V2X

(71) Applicant: LG ELECTRONICS INC., Seoul (KR)

(72) Inventors: Sunghoon Jung, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 17/261,949

(22) PCT Filed: Oct. 28, 2019

(86) PCT No.: PCT/KR2019/014303
§ 371 (c)(1),
(2) Date: Jan. 21, 2021

(87) PCT Pub. No.: WO2020/085885
PCT Pub. Date: Apr. 30, 2020

(65) Prior Publication Data
US 2021/0306111 A1    Sep. 30, 2021

(30) Foreign Application Priority Data

Oct. 26, 2018    (KR) .................. 10-2018-0129097

(51) Int. Cl.
*H04L 1/18*    (2006.01)
*H04W 4/40*    (2018.01)
(Continued)

(52) U.S. Cl.
CPC .......... *H04L 1/1867* (2013.01); *H04L 1/1671* (2013.01); *H04L 1/189* (2013.01);
(Continued)

(58) Field of Classification Search
CPC ... H04L 1/1867; H04L 1/1671; H04L 1/1887; H04L 1/189; H04L 5/0053; H04W 4/40
See application file for complete search history.

(56) References Cited

U.S. PATENT DOCUMENTS

| | | | |
|---|---|---|---|
| 2015/0172023 A1* | 6/2015 | Yang | H04W 72/0413 370/329 |
| 2018/0302144 A1 | 10/2018 | Kazmi et al. | |

(Continued)

FOREIGN PATENT DOCUMENTS

| | | |
|---|---|---|
| KR | 10-2008-0025141 | 3/2008 |
| KR | 10-2016-0091437 | 8/2016 |

(Continued)

OTHER PUBLICATIONS

Z. Naghsh and S. Valaee, "Delay-aware Conflict-free Scheduling for LTE-V, Sidelink 5G V2X Vehicular Communication, in Highways," 2018 52nd Asilomar Conference on Signals, Systems, and Computers, 2018, pp. 1452-1456, (Year: 2018).*

(Continued)

*Primary Examiner* — Cynthia Britt
(74) *Attorney, Agent, or Firm* — Lee Hong Degerman Kang Waimey

(57) ABSTRACT

Proposed are a method for performing retransmission by a first device (100) and an apparatus for supporting the same. The method may include: performing transmission of first information to a second device (200); and performing feedback-based retransmission or blind retransmission of the first information based on a delay deadline for the first information.

8 Claims, 29 Drawing Sheets

(51) Int. Cl.
   *H04L 1/16*     (2006.01)
   *H04L 5/00*     (2006.01)
(52) U.S. Cl.
   CPC ............ *H04L 1/1887* (2013.01); *H04W 4/40* (2018.02); *H04L 5/0053* (2013.01)

(56) References Cited

U.S. PATENT DOCUMENTS

| | | | |
|---|---|---|---|
| 2019/0253186 A1* | 8/2019 | Khoshnevisan | ...... H04L 1/1858 |
| 2019/0253988 A1* | 8/2019 | Khoshnevisan | .... H04W 52/146 |
| 2020/0177318 A1* | 6/2020 | Belleschi | .......... H04W 72/0493 |
| 2021/0014791 A1* | 1/2021 | Freda | ................ H04W 52/0229 |

FOREIGN PATENT DOCUMENTS

| | | |
|---|---|---|
| WO | 2017-157181 | 9/2017 |
| WO | 2018-024946 | 2/2018 |

OTHER PUBLICATIONS

G. Xiog, T. Yang, M. Li, Y. Zhang, W. Song and J. Gong, "A Novel V2X-based Pedestrian Collision Avoidance System and the Effects Analysis of Communication Delay and Packet Loss on Its application," 2018 IEEE International Conference on Vehicular Electronics and Safety (ICVES), 2018, pp. 1-6 (Year: 2018).*
PCT International Application No. PCT/KR2019/014303, International Search Report dated Feb. 4, 2020, 6 pages.

* cited by examiner

FIG. 9
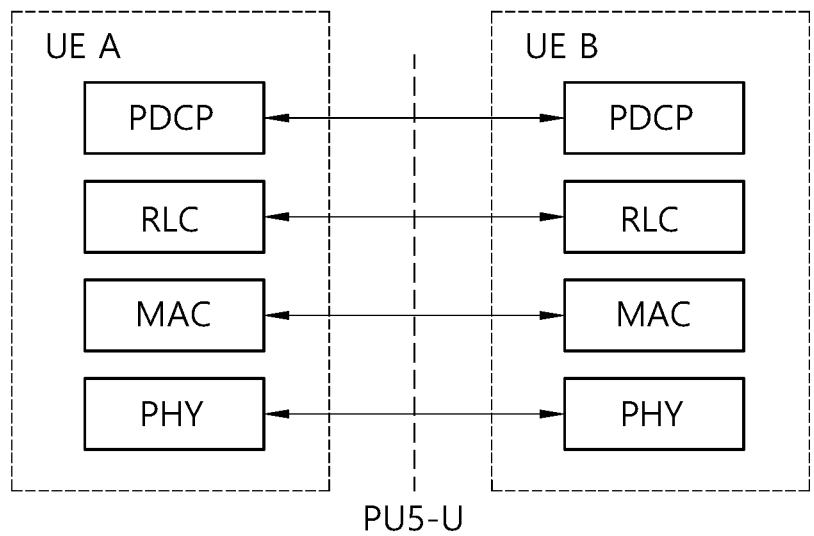
(a)
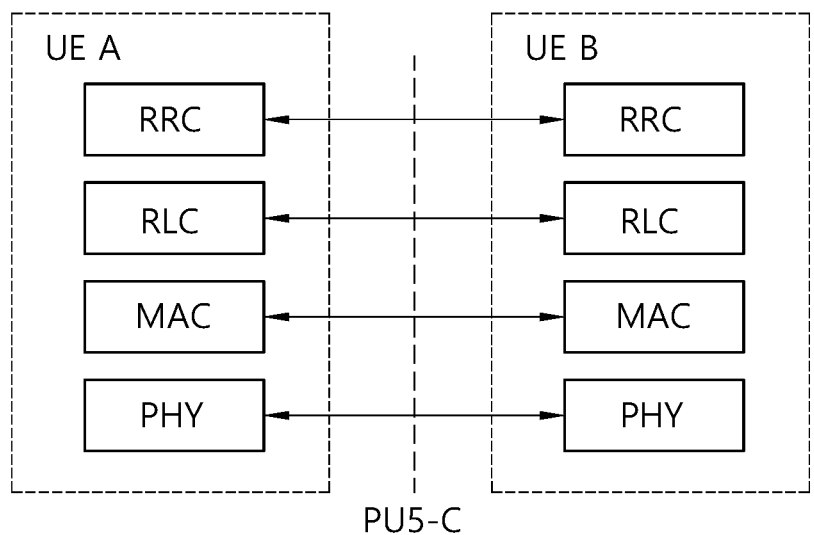
(b)

FIG. 10
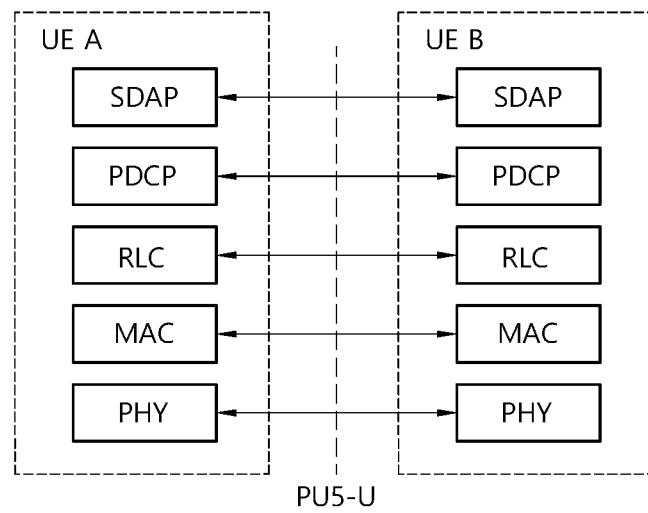
(a)
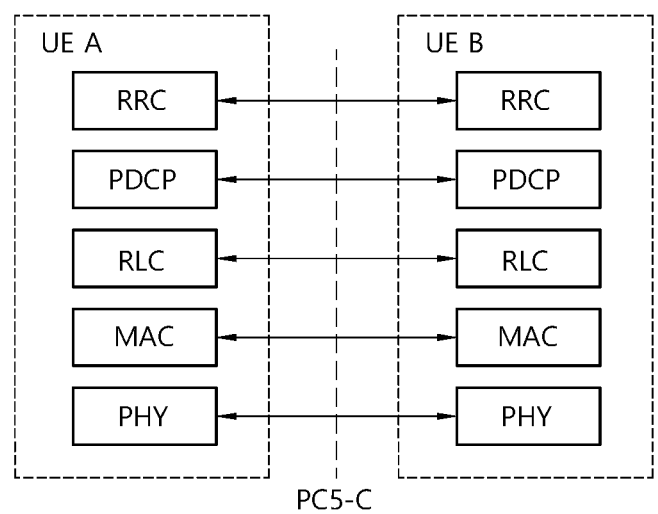
(b)

METHOD AND APPARATUS FOR PERFORMING RETRANSMISSION IN NR V2X

CROSS-REFERENCE TO RELATED APPLICATIONS

This application is the National Stage filing under 35 U.S.C. 371 of International Application No. PCT/KR2019/014303, filed on Oct. 28, 2019, which claims the benefit of Korean Patent Application No. 10-2018-0129097, filed on Oct. 26, 2018, the contents of which is hereby incorporated by reference herein in its entirety.

BACKGROUND OF THE DISCLOSURE

Field of the Disclosure

The present disclosure relates to a wireless communication system.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Meanwhile, sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE DISCLOSURE

A UE may use a retransmission technique to increase the transmission rate of a packet. For example, a first device (100) may perform feedback-based retransmission or blind retransmission.

For example, according to the feedback-based retransmission, the first device (100) may perform retransmission only when transmission to a second device (200) fails. Thus, the first device (100) may avoid unnecessary retransmission. However, according to the feedback-based retransmission, since the first device (100) needs time to verify receipt of feedback from the second device (200), a delay may occur accordingly.

For example, according to the blind retransmission, the first device (100) may perform retransmission arbitrarily or a fixed number of times, thereby increasing a packet transmission rate. However, according to the blind retransmission, the first device (100) may perform unnecessary retransmission a plurality of times, thus wasting radio resources. Furthermore, according to the blind retransmission, the first device (100) cannot verify whether the second device (200) has successfully received a packet transmitted by the first device 100. Accordingly, when the first device (100) performs blind retransmission on a channel having a poor channel condition a small number of times, the packet transmission rate of the first device (100) may be reduced.

Therefore, it is necessary to propose a transmission method for overcoming a transmission delay due to feedback-based retransmission while minimizing unnecessary retransmission due to blind retransmission and an apparatus for supporting the same.

According to an embodiment, there is provided a method for a first device (100) to perform retransmission. The method may include: performing transmission of first information to a second device (200); and performing retransmission of the first information based on a delay deadline for the first information.

According to an embodiment, there is provided a first device (100) for performing retransmission. The first device (100) may include at least one memory, at least one transceiver, and at least one processor to couple the at least one memory and the at least one transceiver. The processor may be configured to: control the transceiver (106) to transmit first information to a second device (200); and control the transceiver (106) to retransmit the first information based on a delay deadline for the first information.

Retransmission can be performed efficiently.

BRIEF DESCRIPTION OF THE DRAWINGS

FIG. 9 shows a protocol stack for a SL communication in accordance with an embodiment of the present disclosure.

FIG. 10 shows a protocol stack for a SL communication in accordance with an embodiment of the present disclosure.

DESCRIPTION OF EXEMPLARY EMBODIMENTS

In various embodiments of the present disclosure, it shall be interpreted that "/" and "," indicate "and/or". For example, "A/B" may mean "A and/or B". Additionally, "A, B" may also mean "A and/or B". Moreover, "A/B/C" may mean "at least one of A, B and/or C". Furthermore, "A, B, C" may also mean "at least one of A, B and/or C".

Furthermore, in various embodiments of the present disclosure, it shall be interpreted that "or" indicates "and/or". For example, "A or B" may include "only A", "only B", and/or "both A and B". In other words, in various embodiments of the present disclosure, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A, which is a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
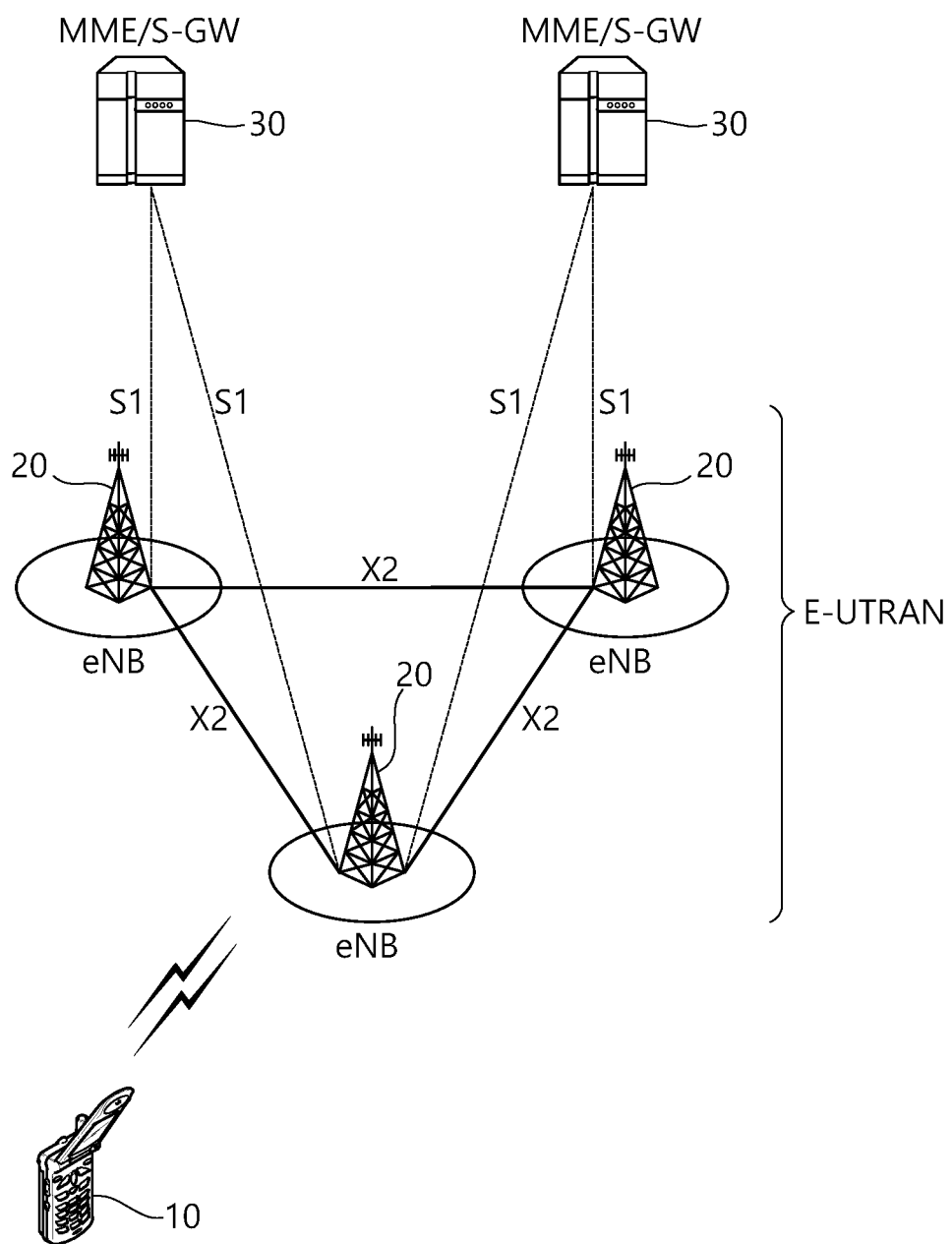
FIG. 1 shows a structure of an LTE system in accordance with an embodiment of the present disclosure.

FIG. 1 shows a structure of an LTE system in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicates with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW is a gateway having an E-UTRAN as its endpoint. And, the P-GW is a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
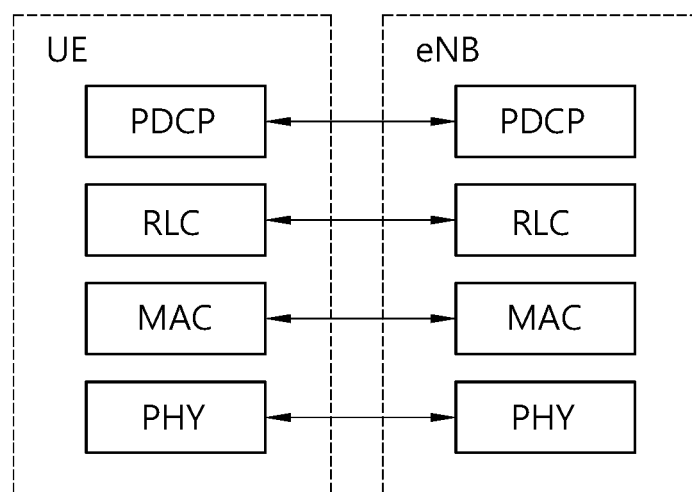
FIG. 2 shows a radio protocol architecture of a user plane in accordance with an embodiment of the present disclosure.
Figure 3:
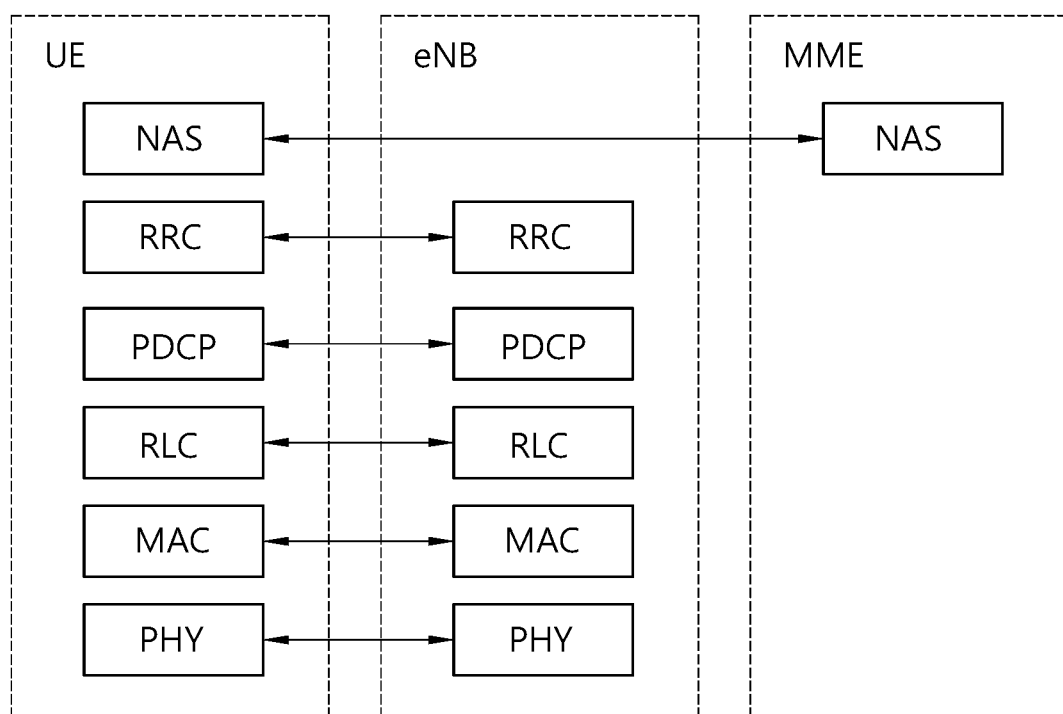
FIG. 3 shows a radio protocol architecture of a control plane in accordance with an embodiment of the present disclosure.

FIG. 2 shows a radio protocol architecture of a user plane in accordance with an embodiment of the present disclosure. FIG. 3 shows a radio protocol architecture of a control plane in accordance with an embodiment of the present disclosure. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
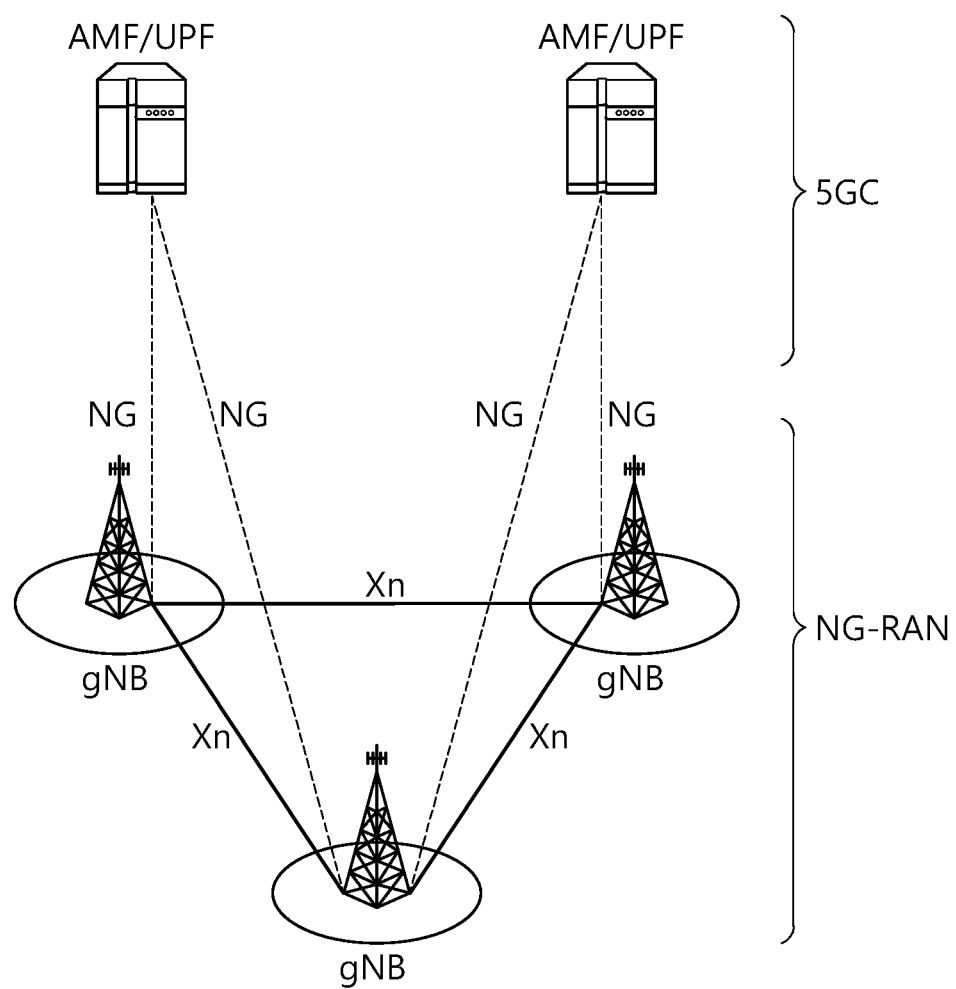
FIG. 4 shows a structure of an NR system in accordance with an embodiment of the present disclosure.

FIG. 4 shows a structure of an NR system in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via $5^{th}$ Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
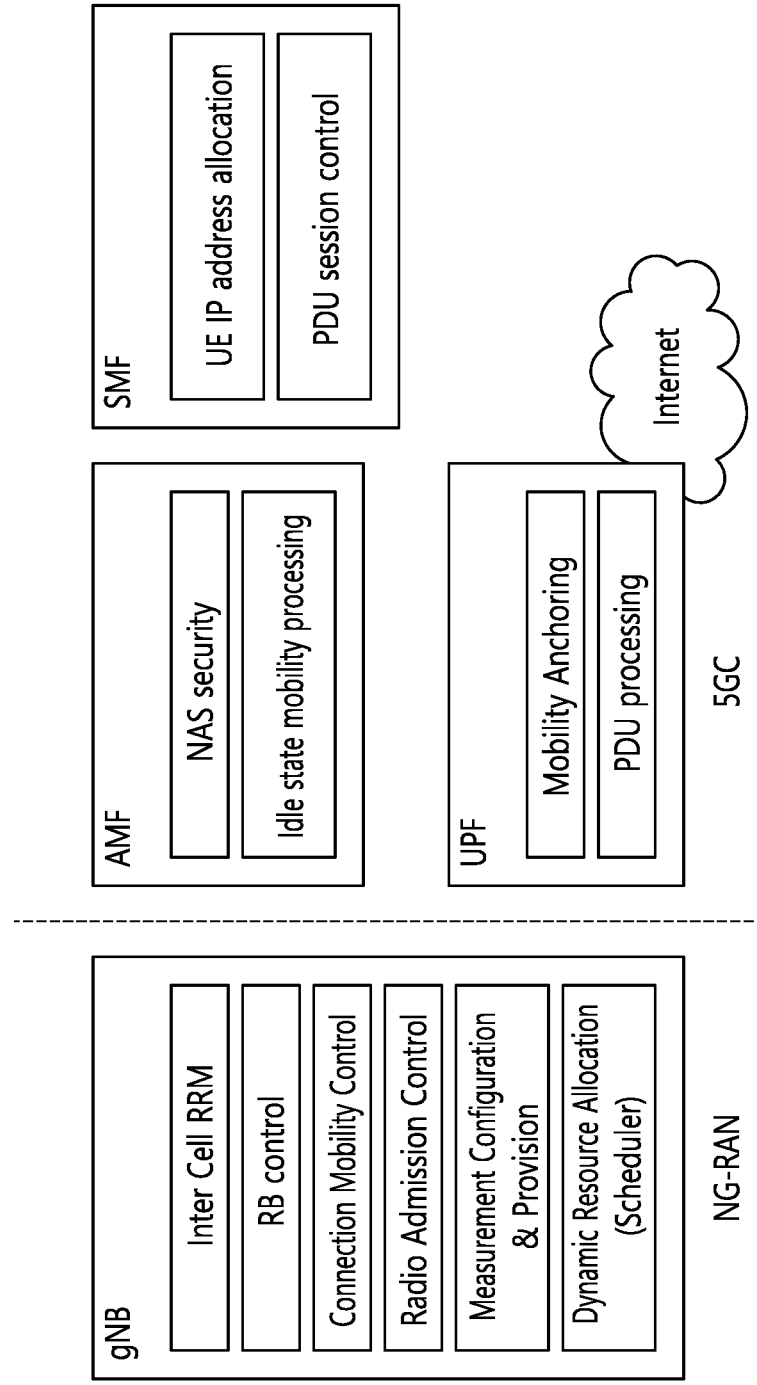
FIG. 5 shows a functional division between an NG-RAN and a 5GC in accordance with an embodiment of the present disclosure.

FIG. 5 shows a functional division between an NG-RAN and a 5GC in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
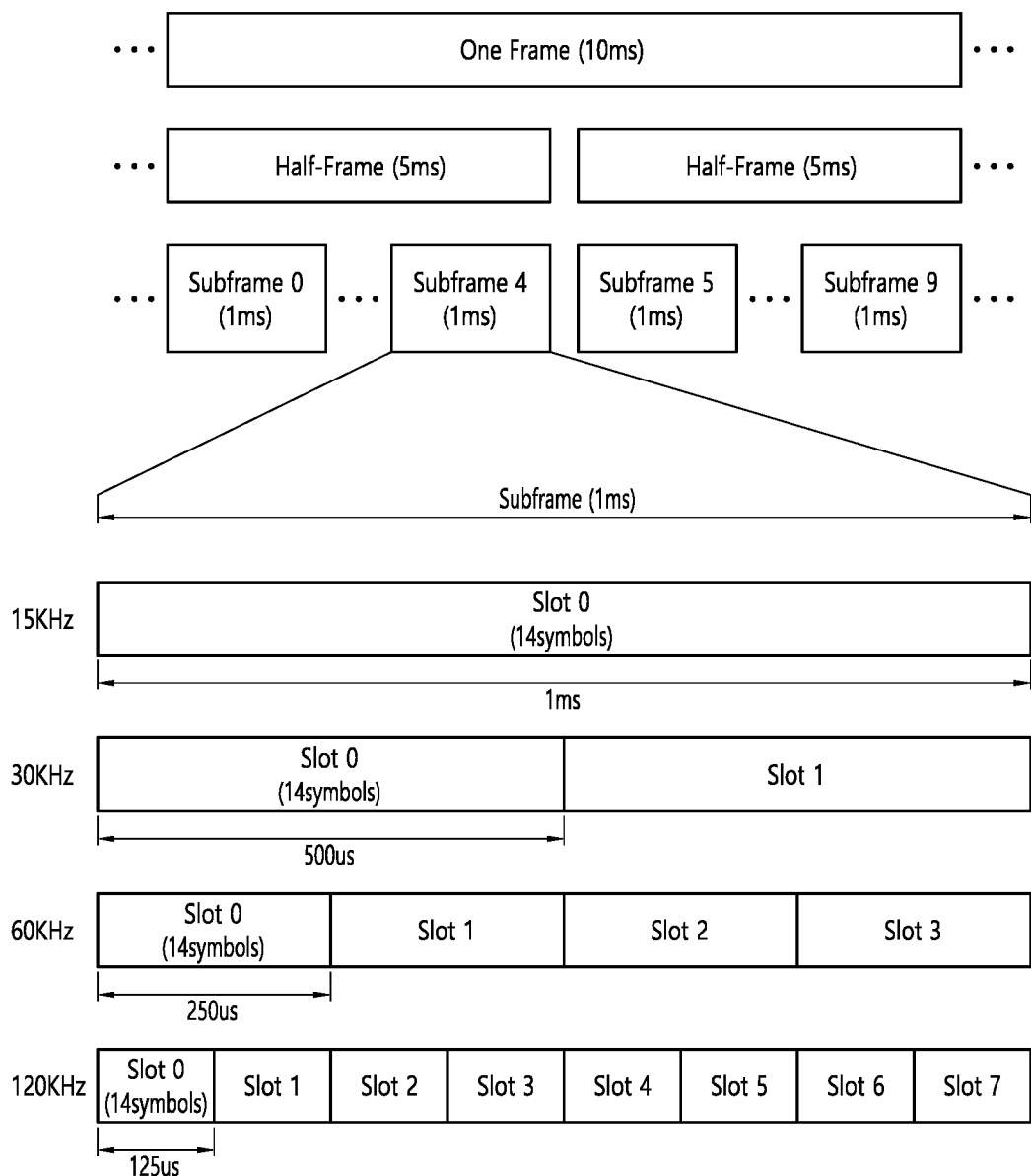
FIG. 6 shows a structure of a radio frame of an NR in accordance with an embodiment of the present disclosure.

FIG. 6 shows a structure of a radio frame of an NR in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 7:
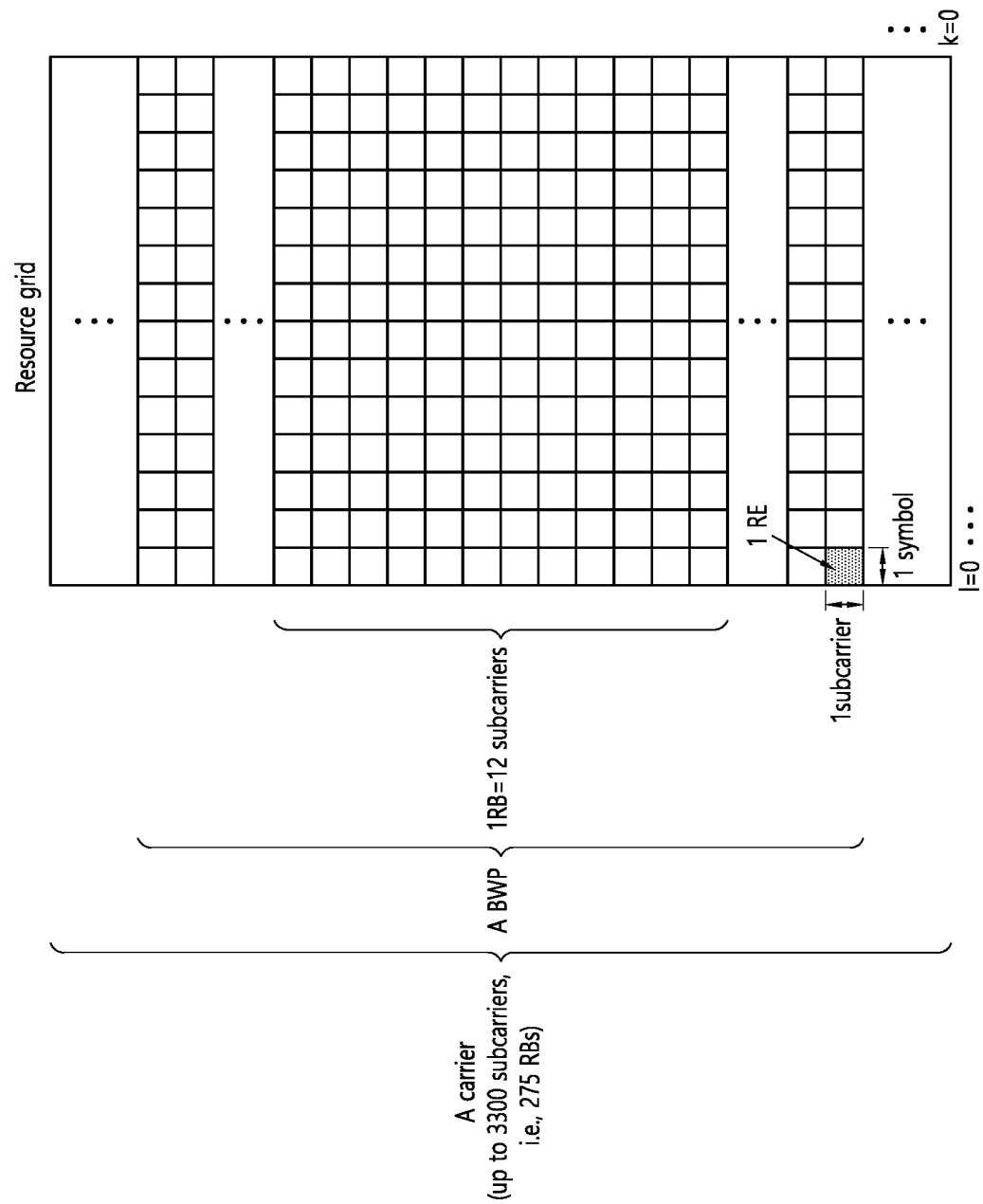
FIG. 7 shows a structure of a slot of an NR frame in accordance with an embodiment of the present disclosure.

FIG. 7 shows a structure of a slot of an NR frame in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/ configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a higher layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage NR V2X UE and an RRC_IDLE UE. For a UE operating in the RRC_CONNECTED mode, at least one SL BWP may be activated within a carrier.

Figure 8:
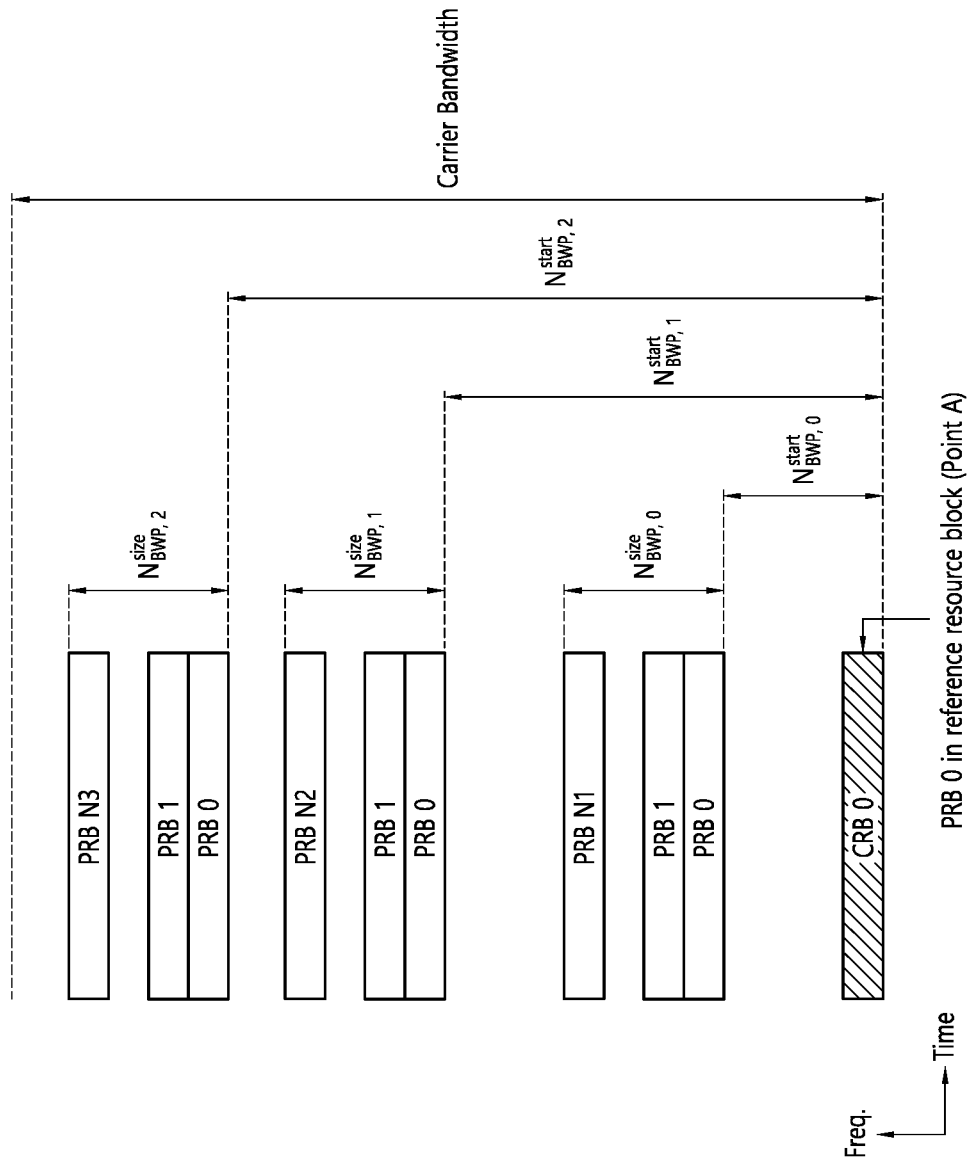
FIG. 8 shows an example of a BWP in accordance with an embodiment of the present disclosure.

FIG. 8 shows an example of a BWP in accordance with an embodiment of the present disclosure. In the embodiment of FIG. 8, it is assumed that three BWPs exist.

Referring to FIG. 8, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Hereinafter, V2X or SL communication will be described.

FIG. 9 shows a protocol stack for a SL communication in accordance with an embodiment of the present disclosure. More specifically, (a) of FIG. 9 shows a user plane protocol stack of LTE, and (b) of FIG. 9 shows a control plane protocol stack of LTE.

FIG. 10 shows a protocol stack for a SL communication in accordance with an embodiment of the present disclosure. More specifically, (a) of FIG. 10 shows a user plane protocol stack of NR, and (b) of FIG. 10 shows a control plane protocol stack of NR.

Hereinafter, SL Synchronization Signal (SLSS) and synchronization information will be described.

SLSS is a SL specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving SL signals. For example, the basic information may be information related to SLSS, a Duplex mode (DM), Time Division Duplex Uplink/Downlink (TDD UL/DL) configuration, information related to a resource pool, application types related to SLSS, a subframe offset, broadcast information, and so on.

The S-PSS, the S-SSS, and the PSBCH may be included in a block format (e.g., a SL SS/PSBCH block, hereinafter referred to as Sidelink-Synchronization Signal Block (S-SSB)). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL Bandwidth Part (BWP). And, a frequency position of the S-SSB may be (pre-)configured. Therefore, the UE is not required to perform a hypothesis detection in order to discover the S-SSB in the carrier.

Each SLSS may have a physical layer SL synchronization identity (ID), and the respective value may be equal to any one value ranging from 0 to 335. Depending upon one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer SL synchronization ID values, values 0 to 167 may be values being used by a network, and values from 168 to 335 may be values being used outside of the network coverage.

Figure 11:
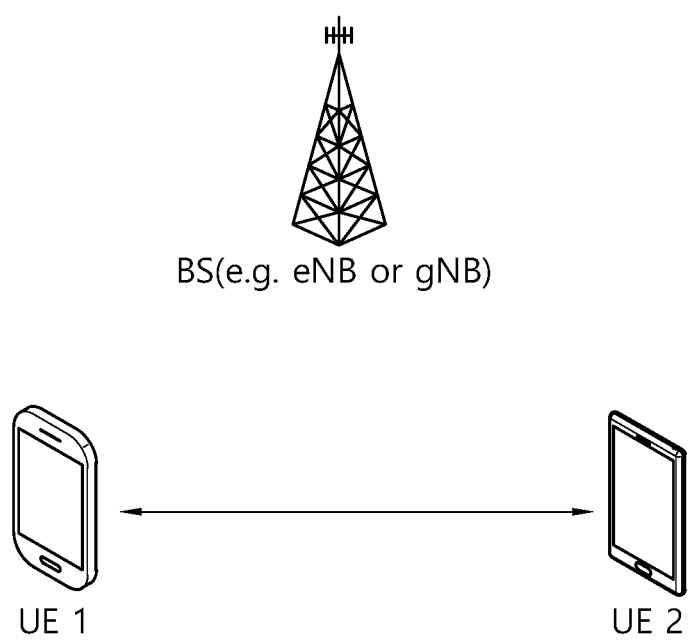
FIG. 11 shows a UE performing V2X or SL communication in accordance with an embodiment of the present disclosure.

FIG. 11 shows a UE performing V2X or SL communication in accordance with an embodiment of the present disclosure.

Referring to FIG. 11, in V2X/SL communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a SL signal by using the corresponding resource unit. User equipment 2 (UE2), which is to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside a connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its SL signal transmission.

Figure 12:
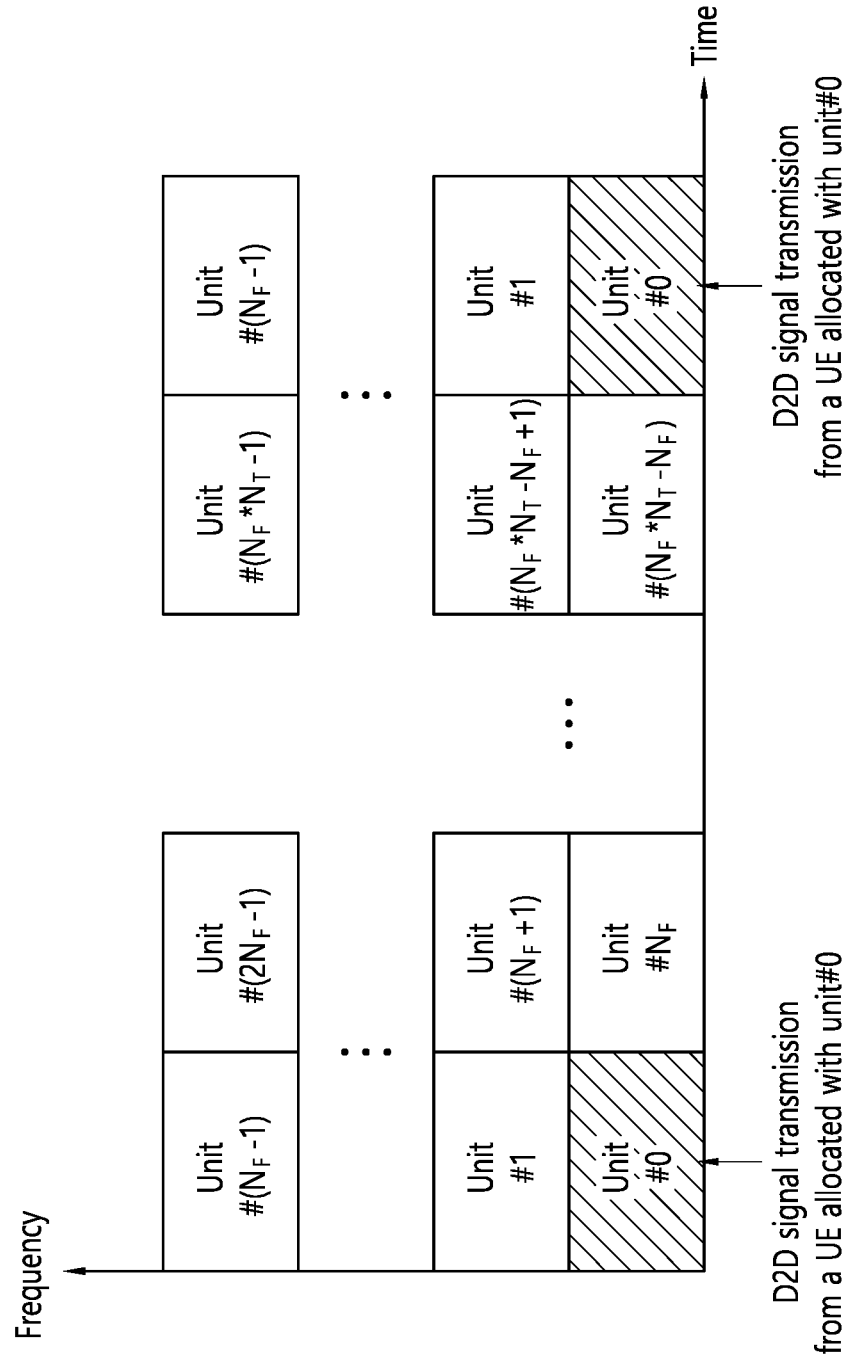
FIG. 12 shows a resource unit for V2X or SL communication in accordance with an embodiment of the present disclosure.

FIG. 12 shows a resource unit for V2X or SL communication in accordance with an embodiment of the present disclosure.

Referring to FIG. 12, the total frequency resources of the resource pool may be divided into $N_F$ number of resource units, the total time resources of the resource pool may be divided into $N_T$ number of resource units. Therefore, a total of $N_F*N_T$ number of resource units may be defined in the resource pool. FIG. 12 shows an example of a case where the corresponding resource pool is repeated at a cycle of $N_T$ number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit SL signals.

The resource pool may be segmented to multiple types. For example, depending upon the content of a SL signal being transmitted from each resource pool, the resource pool may be divided as described below.

(1) Scheduling Assignment (SA) may be a signal including information, such as a position of a resource that is used for the transmission of a SL data channel, a Modulation and Coding Scheme (MCS) or Multiple Input Multiple Output (MIMO) transmission scheme needed for the modulation of other data channels, a Timing Advance (TA), and so on. The SA may also be multiplexed with SL data within the same resource unit and may then be transmitted, and, in this case, an SA resource pool may refer to a resource pool in which the SA is multiplexed with the SL data and then transmitted. The SA may also be referred to as a SL control channel.

(2) A Physical Sidelink Shared Channel (PSSCH) may be a resource pool that is used by a transmitting UE for transmitting user data. If the SA is multiplexed with SL data within the same resource unit and then transmitted, only a SL data channel excluding the SA information may be transmitted from the resource pool that is configured for the SL data channel. In other words, REs that were used for transmitting SA information within a separate resource unit of the SA resource pool may still be used for transmitting SL data from the resource pool of a SL data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described SL signal is the same, different resource pools may be used depending upon the transmission/reception attribute of the SL signal. For example, even if the same SL data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each SL signal within a subframe or a number of subframes being used for the transmission of one SL signal) of the SL signal, signal intensity from the base station, a transmitting power intensity (or level) of a SL UE, and so on.

Hereinafter, resource allocation in a SL will be described.

Figure 13:
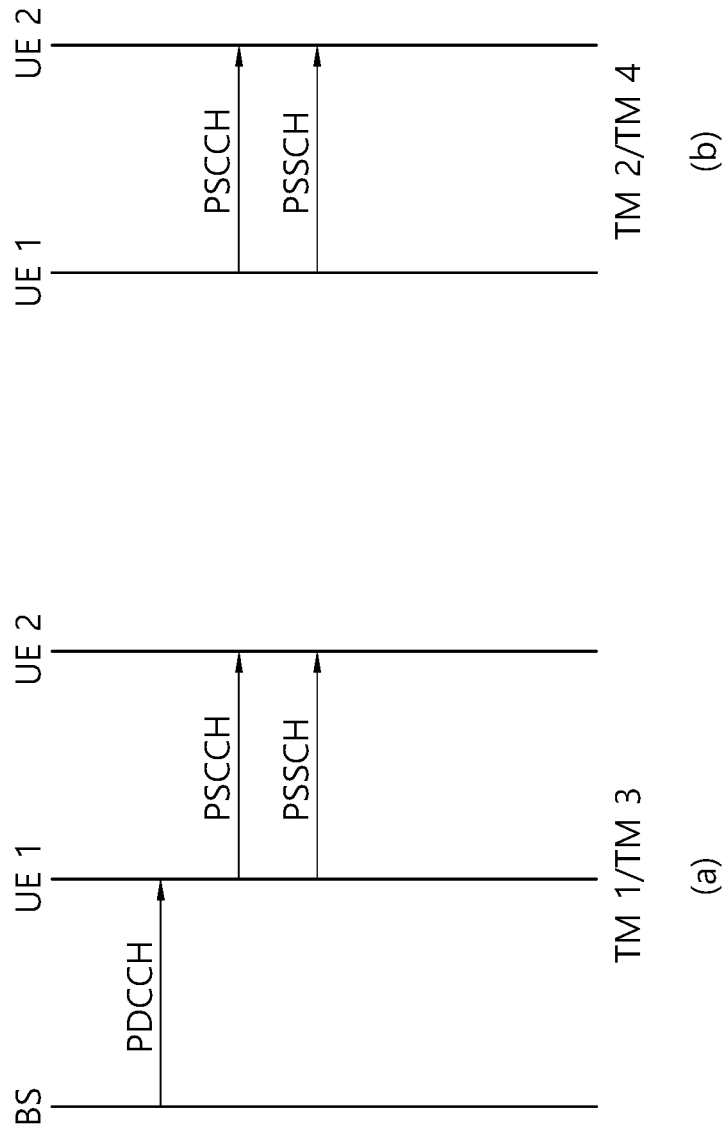
FIG. 13 shows procedures of a UE performing V2X or SL communication according to a transmission mode (TM) in accordance with an embodiment of the present disclosure.

FIG. 13 shows procedures of a UE performing V2X or SL communication according to a transmission mode (TM) in accordance with an embodiment of the present disclosure. Specifically, (a) of FIG. 13 shows a UE operation related to a transmission mode 1 or a transmission mode 3, and (b) of FIG. 13 shows a UE operation related to a transmission mode 2 or a transmission mode 4.

Referring to (a) of FIG. 13, in transmission modes 1/3, the base station performs resource scheduling to UE1 via PDCCH (more specifically, Downlink Control Information (DCI)), and UE1 performs SL/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE SL, transmission mode 1 may be applied to a general SL communication, and transmission mode 3 may be applied to a V2X SL communication.

Referring to (b) of FIG. 13, in transmission modes 2/4, the UE may schedule resources on its own. More specifically, in case of LTE SL, transmission mode 2 may be applied to a general SL communication, and the UE may select a resource from a predetermined resource pool on its own and may then perform SL operations. Transmission mode 4 may be applied to a V2X SL communication, and the UE may carry out a sensing/SA decoding procedure, and so on, and select a resource within a selection window on its own and may then perform V2X SL operations. After transmitting the SCI to UE2 via PSCCH, UE1 may transmit SCI-based data via PSSCH. Hereinafter, the transmission mode may be abbreviated to the term mode.

In case of NR SL, at least two types of SL resource allocation modes may be defined. In case of mode 1, the base station may schedule SL resources that are to be used for SL transmission. In case of mode 2, the user equipment (UE) may determine a SL transmission resource from SL resources that are configured by the base station/network or predetermined SL resources. The configured SL resources or the pre-determined SL resources may be a resource pool. For example, in case of mode 2, the UE may autonomously select a SL resource for transmission. For example, in case of mode 2, the UE may assist (or help) SL resource selection of another UE. For example, in case of mode 2, the UE may be configured with an NR configured grant for SL transmission. For example, in case of mode 2, the UE may schedule SL transmission of another UE. And, mode 2 may at least support reservation of SL resources for blind retransmission.

Procedures related to sensing and resource (re-)selection may be supported in resource allocation mode 2. The sensing procedure may be defined as a process decoding the SCI from another UE and/or SL measurement. The decoding of the SCI in the sensing procedure may at least provide information on a SL resource that is being indicated by a UE transmitting the SCI. When the corresponding SCI is decoded, the sensing procedure may use L1 SL Reference Signal Received Power (RSRP) measurement, which is based on SL Demodulation Reference Signal (DMRS). The resource (re-)selection procedure may use a result of the sensing procedure in order to determine the resource for the SL transmission.

Figure 14:
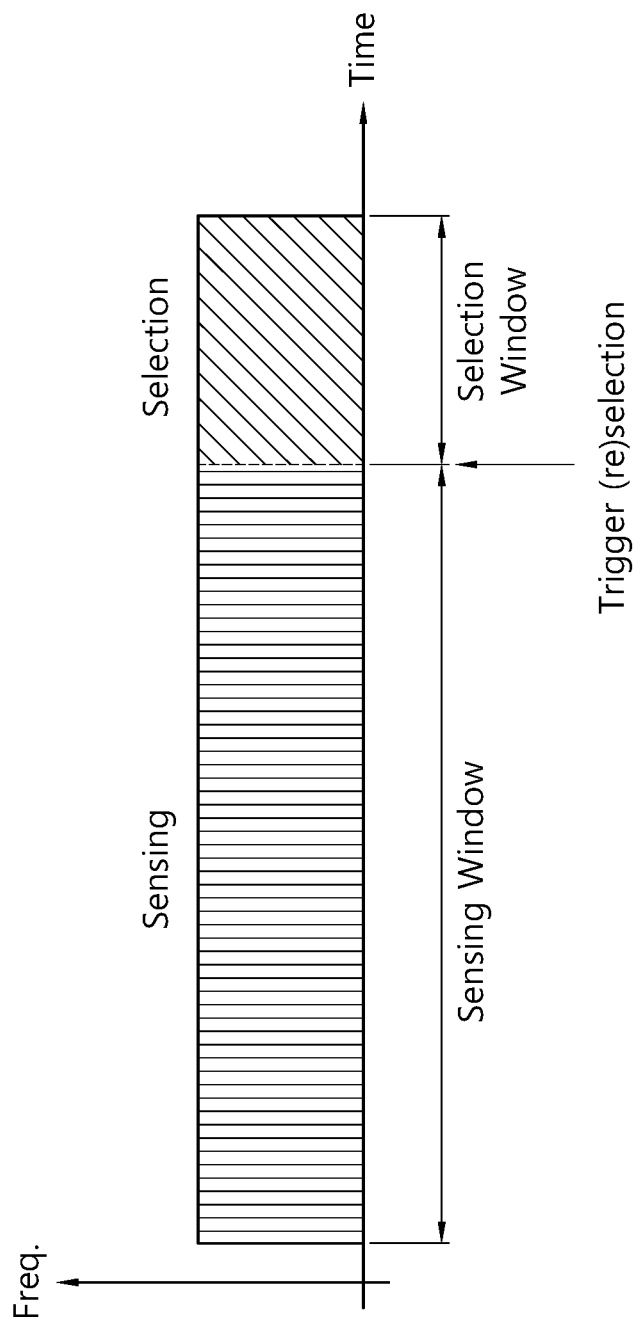
FIG. 14 shows a method of selecting a transmission resource by a UE in accordance with an embodiment of the present disclosure.

FIG. 14 shows a method of selecting a transmission resource by a UE in accordance with an embodiment of the present disclosure.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceeds a threshold value from the selection window. Thereafter, the UE may randomly select a SL resource from the remaining resources within the selection window.

Alternatively, the UE may measure a Received Signal Strength Indicator (RSSI) of the periodic resources within the sensing window and may then determine the resources having low interference (e.g., the lower 20% of the resources). Additionally, the UE may also randomly select a SL resource from the resources included in the selection window among the periodic resources. For example, in case the UE fails to perform decoding of the PSCCH, the UE may use the above described methods.

Figure 15:
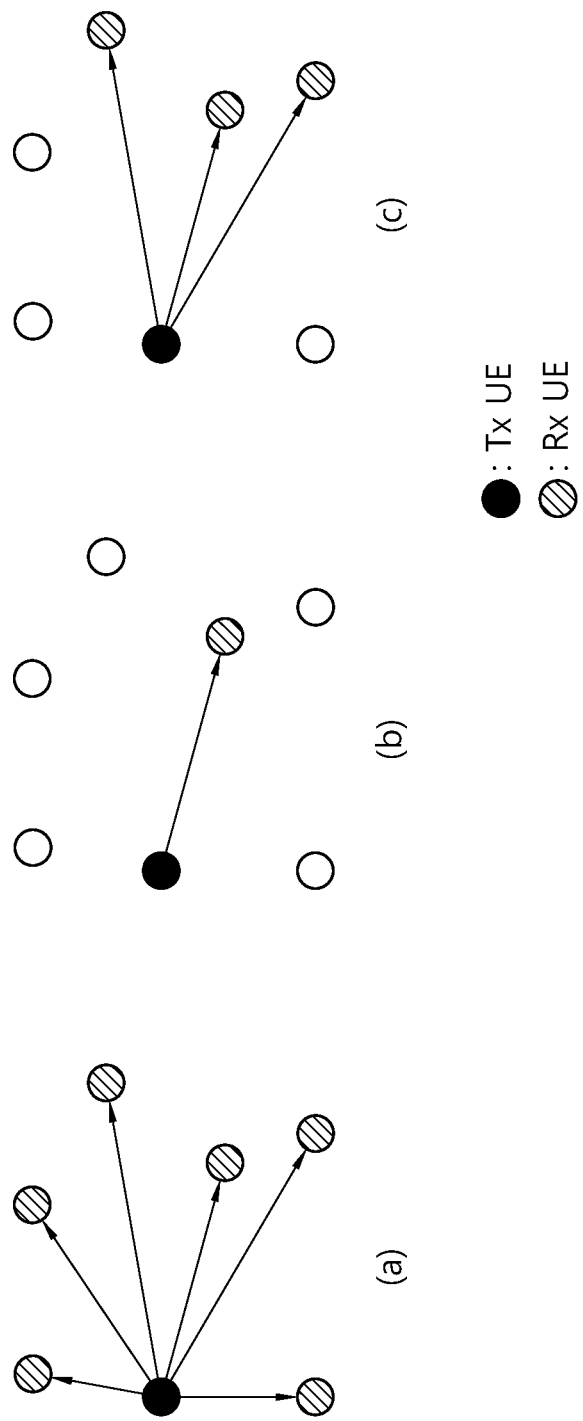
FIG. 15 shows three different cast types in accordance with an embodiment of the present disclosure.

FIG. 15 shows three different cast types in accordance with an embodiment of the present disclosure.

More specifically, (a) of FIG. 15 shows a broadcast type SL communication, (b) of FIG. 15 shows a unicast type SL communication, and (c) of FIG. 15 shows a groupcast type SL communication. In case of the broadcast type SL communication, the UE may perform one-to-one communication with another UE. And, in case of the unicast type SL communication, the UE may perform SL communication with one or more other UEs within the group to which the corresponding UE belongs. In the various embodiments of the present disclosure, the SL groupcast communication may be replaced with SL multicast communication, SL one-to-many communication, and so on.

Hereinafter, a Hybrid Automatic Repeat Request (HARQ) procedure in an SL will be described in detail.

In case of SL unicast and SL groupcast, HARQ feedback and HARQ combining in a physical layer may be supported. For example, in case a receiving UE operates in a Resource Allocation Mode 1 or 2, the receiving UE may receive a PSSCH from a transmitting UE, and the receiving UE may transmit an HARQ feedback corresponding to the PSSCH to the transmitting UE by using a Sidelink Feedback Control Information (SFCI) format via Physical Sidelink Feedback Channel (PSFCH).

For example, an SL HARQ feedback may be enabled for the unicast. In this case, in a non-Code Block Group (non-CBG), the receiving UE may decode a PSCCH targeting the receiving UE, and, when the receiving UE successfully decodes a transport block related to the PSCCH, the receiving UE may generate an HARQ-ACK. Thereafter, the receiving UE may transmit the HARQ-ACK to the transmitting UE. Conversely, after the receiving UE decodes the PSCCH targeting the receiving UE, if the receiving UE fails to successfully decode a transport block related to the PSCCH, the receiving UE may generate an HARQ-NACK, and the receiving UE may transmit the HARQ-NACK to the transmitting UE.

For example, an SL HARQ feedback may be enabled for the groupcast. For example, during the non-CBG, two different types of HARQ feedback options may be supported for the groupcast.

(1) Groupcast option 1: After decoding a PSCCH targeting the receiving UE, if the receiving UE fails to decode a transport block related to the PSCCH, the receiving UE may transmit an HARQ-NACK to a transmitting UE via a PSFCH. Conversely, when a receiving UE decodes a PSCCH targeting the receiving UE, and when the receiving UE successfully decodes a transport block related to the PSCCH, the receiving UE may not transmit an HARQ-ACK to a transmitting UE.

(2) Groupcast option 2: After decoding a PSCCH targeting the receiving UE, if the receiving UE fails to decode a transport block related to the PSCCH, the receiving UE may transmit an HARQ-NACK to a transmitting UE via a PSFCH. And, when the receiving UE decodes a PSCCH targeting the receiving UE, and when the receiving UE successfully decodes a transport block related to the PSCCH, the receiving UE may transmit an HARQ-ACK to a transmitting UE via the PSFCH.

According to a related art, a UE may use a retransmission technique to increase the transmission rate of a packet. For example, a first device (100) may selectively retransmit a packet to a second device (200) based on feedback on whether the second device (200) has successfully received the packet. For convenience of description, an operation in which the first device (100) selectively retransmits a packet to the second device (200) based on feedback from the second device (200) may be referred to as feedback-based retransmission. Alternatively, for example, the first device (100) may perform retransmission without feedback from the second device (200). For convenience of description, an operation in which the first device (100) performs retransmission without feedback from the second device (200) may be referred to as blind retransmission. For example, an operation in which the first device (100) performs retransmission to the second device (200) by reducing code rate compared to the previous transmission may be referred to as blind retransmission. For example, when a delay margin is a threshold value or greater, the first device (100) may perform retransmission to the second device (200) by reducing redundancy rate, and when the delay margin is the threshold value or less, the first device (100) may perform retransmission to the second device (200) by increasing redundancy rate. For example, an operation in which the first device (100) transmits a coded packet to the second device (200) may be referred to as blind retransmission. For example, the feedback may be HARQ feedback.

For example, according to the feedback-based retransmission, the first device (100) may perform retransmission only when transmission to a second device (200) fails. Thus, the first device (100) may avoid unnecessary retransmission. However, according to the feedback-based retransmission, since the first device (100) needs time to verify receipt of feedback from the second device (200), a delay may occur accordingly.

For example, according to the blind retransmission, the first device (100) may perform retransmission arbitrarily or a fixed number of times, thereby increasing a packet transmission rate. However, according to the blind retransmission, the first device (100) may perform unnecessary retransmission a plurality of times, thus wasting radio resources. Furthermore, according to the blind retransmission, the first device (100) cannot verify whether the second device (200) has successfully received a packet transmitted by the first device (100). Accordingly, when the first device (100) performs blind retransmission on a channel having a poor channel condition a small number of times, the packet transmission rate of the first device (100) may be reduced.

Therefore, it is necessary to propose a transmission technique for overcoming a transmission delay due to feedback-based retransmission while minimizing unnecessary retransmission due to blind retransmission. According to various embodiments of the present disclosure, a method for transmitting information by different transmission methods according to time in view of a delay requirement for the information to be transmitted by the first device (100) and an apparatus for supporting the same are proposed.

In various embodiments of the present disclosure, the information may include at least one of an SL packet, SL data, an SL message, an SL service, SL control information, an SL data channel, and/or an SL control channel. For example, in various embodiments of the present disclosure, the information may include at least one of a UL packet, UL data, a UL message, a UL service, UL control information, a UL data channel, and/or a UL control channel. For example, in various embodiments of the present disclosure, the information may include at least one of a DL packet, DL data, a DL message, a DL service, DL control information, a DL data channel, and/or a DL control channel. For example, in various embodiments of the present disclosure, the delay requirement for the information may include a packet delay budget (PDB).

In various embodiments of the present disclosure, ProSe Per-Packet Priority (PPPP) may be replaced with ProSe Per-Packet Reliability (PPPR), and PPPR may be replaced with PPPP. For example, a smaller PPPP value may indicate a higher priority, and a greater PPPP value may indicate a lower priority. For example, a smaller PPPR value may indicate higher reliability, and a greater PPPR value may indicate lower reliability. For example, a PPPP value related to a service, a packet, or a message related to a high priority may be smaller than a PPPP value related to a service, a packet, or a message related to a lower priority. For example, a PPPR value related to a service, a packet, or a message related to high reliability may be smaller than a PPPR value related to a service, a packet, or a message related to low reliability.

In various embodiments of the present disclosure, a current time point may be referred to as T. A transmission delay deadline for information to be transmitted included in a transmission buffer of the first device (100) may be referred to as Td. For example, an actual transmission delay deadline for the information to be transmitted by the first device (100) may be the same as Td. For example, the actual transmission delay deadline for the information to be transmitted by the first device (100) may be a time point corresponding to Td plus a specific margin value (Tm). For example, the actual transmission delay deadline for the information to be transmitted by the first device (100) may be referred to as Tmax.

In various embodiments of the present disclosure, the first device (100) may perform HARQ transmission/retransmission. For example, the HARQ transmission/retransmission may be performed by an MAC layer of the first device (100). For example, the MAC layer may receive information to be transmitted from a higher layer and may transmit the information. The information may be, for example, a packet or a packet data unit. For example, an RLC PDU may be a MAC SDU. For example, the MAC layer may store information to be transmitted in a transmission buffer. The transmission buffer may be a transmission buffer used to transmit the information using a specific interface. For example, the transmission buffer may be used to transmit SL information. For example, the transmission buffer may be used to transmit UL information. For example, the transmission buffer may be used to transmit DL information.

In various embodiments of the present disclosure, the first device (100) may perform transmission/retransmission of a PDCP packet. For example, PDCP transmission/retransmission may be performed by a PDCP layer of the first device (100). For example, the PDCP layer may receive information to be transmitted from a higher layer and may transmit the information. The information may be, for example, a packet or a packet data unit. The information may be, for example, a PDCP PDU. For example, the PDCP layer may store information to be transmitted in a transmission buffer. The transmission buffer may be a transmission buffer used to transmit the information using a specific interface. For example, the transmission buffer may be used to transmit UL information. For example, the transmission buffer may be used to transmit SL information. For example, the transmission buffer may be used to transmit DL information. Various embodiments of the present disclosure may be applied to various transmission methods in which retransmission is performed in L2.

In various embodiments of the present disclosure, a remaining time from a time point at which the first device (100) transmits information to a transmission delay deadline for the information may be referred to as Ts or an allowed transmission time. For example, a remaining time from a time point at which the first device (100) determines to transmit the information to the transmission delay deadline for the information may be referred to as Ts or the allowed transmission time. For example, the first device (100) may change a method for retransmitting the information depending on Ts. For example, the first device (100) may perform feedback-based retransmission of the information or may perform blind retransmission of the information according to the allowed transmission time.

For example, when the allowed transmission time is sufficiently long, the first device (100) may transmit the information to the second device (200) and may then perform retransmission based on feedback information indicating whether transmission (reception) of the information is successful from the second device (200). For example, when the allowed transmission time is a threshold value or greater, the first device (100) may perform feedback-based retransmission. For example, the threshold value may be preset or set for the first device (100). For example, the threshold value may be predefined for the first device (100).

For example, when the allowed transmission time is insufficient, the first device (100) may transmit the information to the second device (200) and may then urgently perform retransmission following transmission of the information without waiting for feedback on the transmission of the information. For example, when the allowed transmission time is a threshold value or less, the first device (100) may perform blind retransmission. For example, the threshold value may be preset or set for the first device (100). For example, the threshold value may be predefined for the first device (100).

Figure 16:
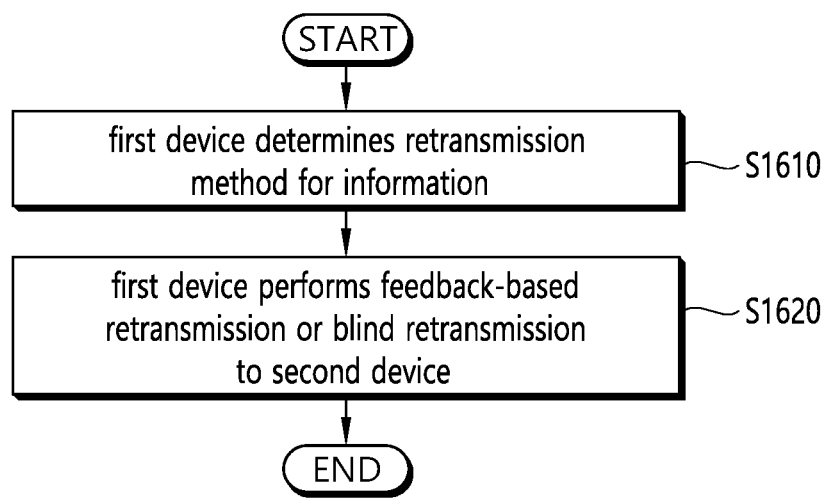
FIG. 16 shows a method for a first device (100) to perform retransmission in accordance with to an embodiment of the present disclosure.

FIG. 16 shows a method for a first device (100) to perform retransmission in accordance with to an embodiment of the present disclosure. The embodiment of FIG. 16 may be combined with various embodiments of the present disclosure.

Referring to FIG. 16, in operation S1610, the first device (100) may determine a method for retransmitting information. For example, the first device (100) may determine the method for retransmitting the information based on a delay requirement for the information.

In operation S1620, the first device (100) may perform feedback-based retransmission or blind retransmission to a second device (200).

Specifically, for example, the first device (100) may determine to transmit the information at a time point of T. For example, transmission of the information may be determined by a MAC layer of the first device (100). For example, the first device (100) may transmit the information to the second device (200) at the time point of T.

For example, the transmission may be initial transmission or new transmission by the first device (100). For example, the transmission may be first transmission of a PDU received by the MAC layer from a higher layer. For example, the transmission may be retransmission by the first device (100). For example, the transmission may be transmission of the PDU received by the MAC layer from the higher layer after the first transmission.

For example, it is assumed that a time point at which the first device (100) can actually transmit information in a buffer to the second device (200) wirelessly is T+T1. Further, it is assumed that a time point at which the first device (100) receives feedback on whether the information is successfully received from the second device (200) receiving the information is T+T1+T2. In addition, it is assumed that a time point at which the first device (100) can wirelessly retransmit the information to the second device (200) after determining retransmission based on the feedback (e.g., NACK feedback) received from the second device (200) is T+T1+T2+T3. It is assumed that T1+T2+T3 is Tsum. For example, when the first device (100) wirelessly transmits information currently in the transmission buffer to the second device (200), receives feedback on whether transmission of the information is successful from the second device (200), determines to retransmit the information based on the feedback, and wirelessly retransmits the information to the second device (200), Tsum may be time taken from a time point at which the first device (100) determines to transmit the information currently in the transmission buffer to a time point at which the first device (100) retransmits the information.

When at least one of T1, T2, and/or T3 is a value that is not constant but variable, the first device (100) may calculate Tsum using an average value each of T1, T2, and/or T3 or average value+margin. When the first device (100) knows the probability distribution of Ti (e.g., i is 1, 2, or 3), the first device (100) may calculate Tsum, considering/determining that T_thres_i satisfying P(Ti<T_thres_i)=P_thres as Ti. P(X<Y) may be a probability value that Y exceeds X.

For example, assuming that the current time point is T, the first device (100) may determine the method for retransmitting the information according to T+M·Tsum and Tmax. For example, the first device (100) may determine the method for retransmitting the information according to whether T+M·Tsum is less than Tmax.

For example, M may be a value set/defined in advance for the first device (100). For example, a network and/or another device may set or preset M for the first device (100). For example, M may be the maximum (average) number of allowed retransmissions to satisfy a service-related QoS requirement. For example, M may be the minimum (average) number of allowed retransmissions to satisfy a service-related QoS requirement. For example, M may be adjusted/determined according to at least one of the priority of traffic, a QoS requirement, and/or a congestion level. For example, the QoS requirement may include a delay budget and/or transmission reliability. For example, the congestion level may include CBR. For example, a relatively great value of M may be applied to traffic having a relatively high priority. For example, a relatively great value of M may be applied to traffic having a strict QoS requirement.

For example, when T+M·Tsum<Tmax, the first device (100) may determine to perform feedback-based retransmission. For example, when T+M*Tsum<Tmax, the first device (100) may transmit the information in the buffer to the second device (200) and may receive feedback on the information from the second device (200). The first device (100) may determine whether to retransmit the information to the second device (200) based on the feedback.

Figure 17:
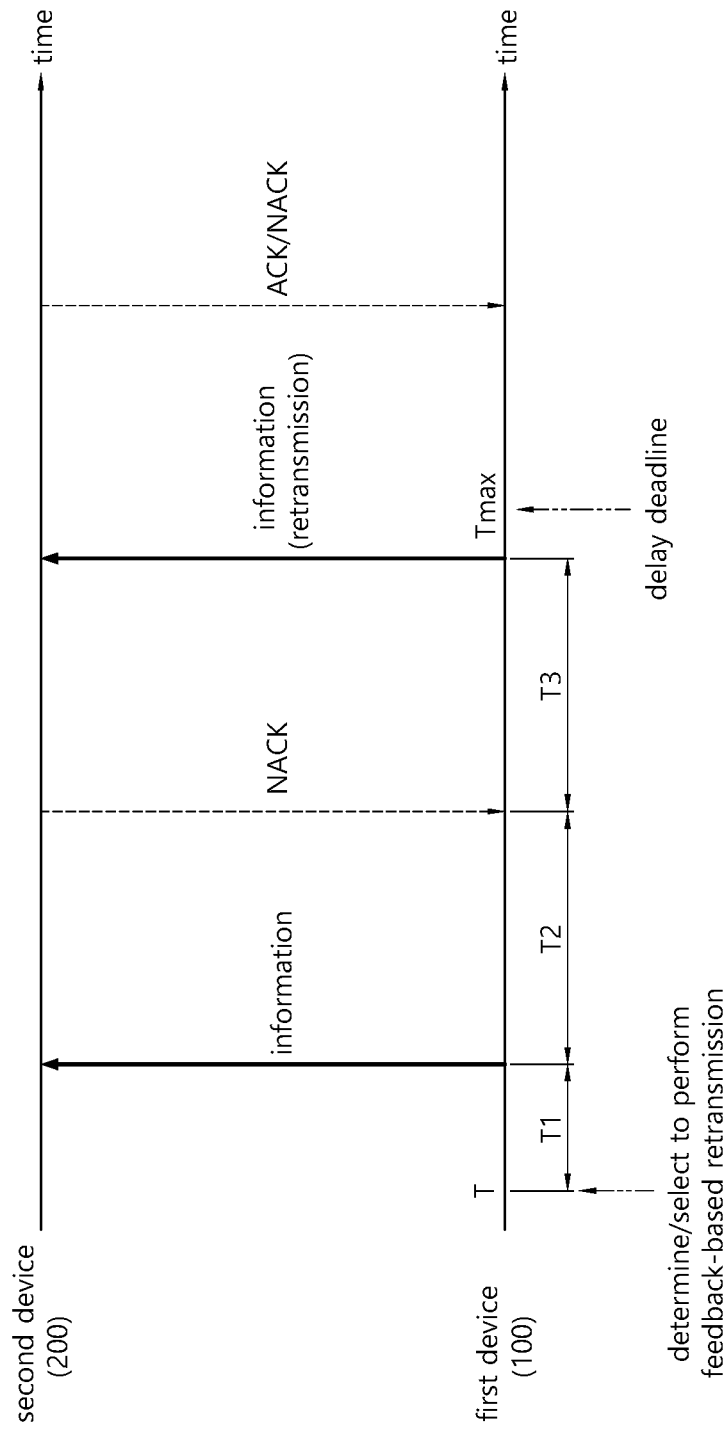
FIG. 17 shows a method for a first device (100) to perform feedback-based retransmission in accordance with to an embodiment of the present disclosure.

FIG. 17 shows a method for a first device (100) to perform feedback-based retransmission in accordance with an embodiment of the present disclosure.

Referring to FIG. 17, the first device (100) may evaluate/determine the value of T+T1+T2+T3 and the value of Tmax at a time point of T. In the embodiment of FIG. 17, since T+T1+T2+T3<Tmax, the first device (100) may determine to perform feedback-based retransmission. Accordingly, the first device (100) may transmit information to a second device (200) at T+T1 and may receive feedback on the information from the second device (200). When the feedback is an NACK, the first device (100) may retransmit the information to the second device (200) at T+T1+T2+T3. Alternatively, for example, when the feedback is the NACK, the first device (100) may retransmit the information to the second device (200) at a time point at which a transmission opportunity is secured at approximately T+T1+T2+T3.

For example, when M is 1, that is, when T+Tsum<Tmax, even though the first device (100) having failed to transmit the information performs retransmission based on the feedback from the second device (200), the retransmitted information may be wirelessly transmitted before Tmax. Generally, when the first device (100) receives NACK feedback from the second device (200), the first device (100) may determine retransmission to the second device (200). In HARQ retransmission, when receiving an HARQ NACK of information transmitted by the first device (100), the first device (100) may perform retransmission.

For example, when T+M·Tsum>Tmax, the first device (100) may determine to perform retransmission without waiting for feedback. For example, when T+M*Tsum>Tmax, the first device (100) may transmit information in a buffer to the second device (200) and may perform blind retransmission without feedback on the information.

Figure 18:
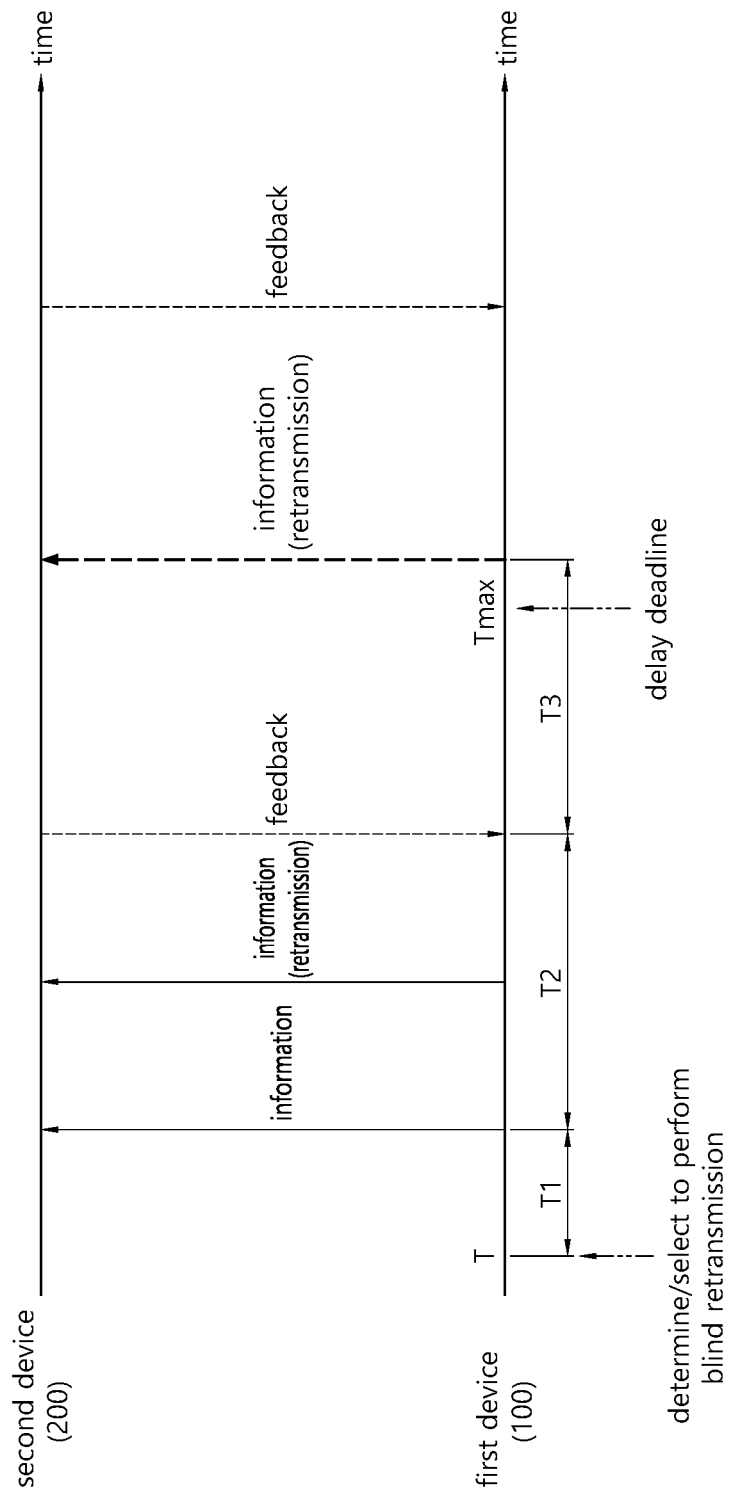
FIG. 18 shows a method for a first device (100) to perform blind retransmission in accordance with to an embodiment of the present disclosure.

FIG. 18 shows a method for a first device (100) to perform blind retransmission in accordance with an embodiment of the present disclosure.

Referring to FIG. 18, the first device (100) may evaluate/determine the value of T+T1+T2+T3 and the value of Tmax at a time point of T. In the embodiment of FIG. 18, since T+T1+T2+T3>Tmax, the first device (100) may determine to perform blind retransmission. Accordingly, the first device (100) may transmit information to a second device (200) at T+T1 and may retransmit the information to the second device (200) regardless of the result of transmitting the information.

For example, when M is 1, that is, when T+Tsum>Tmax, an opportunity for feedback-based retransmission of the transmitted information may not exist before Tmax. According to an embodiment of the present disclosure, in this case, the first device (100) may obtain an opportunity to retransmit the information before Tmax. For example, the first device (100) may perform blind retransmission once with respect to initial transmission. For example, in order to increase the probability of successful reception by the second device (200), the first device (100) may perform blind retransmission a plurality of times with respect to the initial transmission.

For example, the first device (100) may determine the number of blind retransmissions according to a reliability requirement for information to be transmitted. For example, when the first device (100) performs blind retransmission R times, R may be determined according to the reliability requirement for the information to be transmitted by the first device (100) or a congestion level (e.g., CBR). For example, when the information has a relatively high reliability requirement, the first device (100) may apply/determine a relatively great value of R for blind retransmission. For example, the value of R may be may be the maximum (average) number of allowed blind retransmissions to satisfy a service-related QoS requirement. For example, the value of R may be may be the minimum (average) number of allowed blind retransmissions to satisfy a service-related QoS requirement. For example, when the first device (100) cannot support all the R blind retransmissions within Tmax, the first device (100) may perform only as many blind retransmissions as possible within Tmax. For example, when the first device (100) cannot support all the R blind retransmissions within Tmax, the first device (100) may omit transmitting the information.

For example, a MAC layer of the first device (100) may indicate transmission and/or retransmission of the information to a PHY layer of the first device (100). In this case, the MAC layer of the first device (100) may transmit an instruction to perform retransmission of the information R times to the PHY layer of the first device (100). When the MAC layer of the first device (100) is configured to indicate the number of retransmissions to the PHY layer of the first device (100), if the number of retransmissions is not indicated, the first device (100) may retransmit the information once.

Specifically, for example, the MAC layer of the first device (100) may indicate transmission and/or retransmission of the information to the PHY layer of the first device (100) according to the following methods.

For example, the MAC layer of the first device (100) may transmit an instruction to transmit the information and an instruction to retransmit the information to the PHY layer of the first device (100) at the same time.

For example, the MAC layer of the first device (100) may transmit an instruction to transmit the information and an instruction to retransmit the information to the PHY layer of the first device (100) at the same time and may also transmit the value of Tr to the PHY layer of the first device (100). For example, Tr may be a time interval between initial transmission and retransmission.

For example, the MAC layer of the first device (100) may transmit an instruction to transmit the information to the PHY layer of the first device (100). Then, after Tr from the time when the MAC layer of the first device (100) transmits the instruction to transmit the information to the PHY layer of the first device (100), the MAC layer of the first device (100) may transmit an instruction to retransmit the information to the PHY layer of the first device (100). For example, the value of Tr may be differently determined/set according to the priority of the information to be transmitted by the first device (100) and/or a delay budget for the information to be transmitted. For example, the first device (100) may apply a relatively short value of Tr to information having a relatively high priority. For example, the first device (100) may apply a relatively short value of Tr to information having a short time remaining until a deadline.

For example, the first device (100) may perform the initial transmission and retransmission of the information in different resource regions. For example, the PHY layer of the first device (100) may perform the initial transmission and retransmission of the information using different resources. The first device (100) may perform the transmission and the retransmission in consecutive time periods. For example, the transmission and the retransmission may occur on temporally consecutive multi-subframes, multi-slots, and/or multi-minislots. To this end, the first device (100) may perform (mini) slot aggregation in which transmission resources are contiguously combined for use in the time domain. When the value of Tr is not indicated or Tr has a value of zero, the transmission and the retransmission may occur in consecutive time periods. When the value of Tr is indicated and/or Tr has a value other than zero, the first device (100) may perform the retransmission after Tr from the time for the transmission Ttx, that is, at Ttx+Tr.

For example, the first device (100) may independently transmit transmission-related scheduling information and retransmission-related scheduling information using different control channel instances. For example, the first device may transmit the transmission-related scheduling information and the retransmission-related scheduling information through separate pieces of control information.

For example, the first device (100) may transmit the transmission-related scheduling information and one or more pieces of retransmission-related scheduling information via one control channel instance. For example, the first device (100) may transmit the transmission-related scheduling information and the one or more pieces of retransmission-related scheduling information through the same control information. For example, the control channel instance including the scheduling information may include the number of retransmissions and/or time information and/or frequency information on a radio resource for performing each retransmission. For example, when a plurality of (re)transmissions is temporally contiguous, the control channel instance may indicate a time period occupied by each (re)transmission. For example, when a frequency resource used for each retransmission is the same as a frequency resource used for the transmission, information on a frequency may not be included in the control channel instance.

For example, the first device (100) may transmit the transmission-related scheduling information and the retransmission-related scheduling information using different control channel instances. In this case, the first device (100) may transmit one or more pieces of retransmission-related scheduling information via one control channel instance. For example, the control channel instance including the retransmission-related scheduling information may include at least one of the number of retransmissions, time information and/or frequency information on a radio resource for performing each retransmission, and/or information necessary for decoding. For example, the information necessary for decoding may include a modulation and channel coding scheme/coding rate, a redundancy version, and the like. For example, when a plurality of retransmissions is temporally contiguous, the control channel instance for retransmission-related scheduling may indicate the duration of a resource occupied by each (re)transmission. For example, when the duration of a resource used for first retransmission and the duration of a resource used for subsequent retransmission are the same, information indicating the duration of the resource for the subsequent retransmission may be omitted. For example, when a frequency resource for the first retransmission and a frequency resource for the subsequent retransmission indicated by the control channel instance for retransmission-related scheduling are the same, information on the frequency resource for the subsequent retransmission may be omitted.

A resource region for blind retransmission may be separately allocated. Information on the resource region separately allocated for blind retransmission may be preset for the UE.

According to an embodiment of the present disclosure, when the first device (100) transmits information to the second device (200) but fails to receive feedback on the information within a time in which the first device (100) expects to receive the feedback, the first device (100) may perform blind retransmission assuming/determining that the first device (100) has received NACK feedback. Specifically, for example, when T+Tsum<Tmax is satisfied, the first device (100) may transmit information to the second device (200) and wait for feedback. In this case, when the first device (100) fails to receive the feedback until a time point of T+T1+T2, the first device (100) may perform blind retransmission assuming/determining that the first device (100) has received NACK feedback. For example, the first device (100) may retransmit the information once according to various embodiments of the present disclosure. For example, the first device (100) may retransmit the information a plurality of times according to various embodiments of the present disclosure.

According to an embodiment of the present disclosure, the first device (100) may selectively or differentially apply various implementations of the present disclosure according to the priority of information to be transmitted by the first device (100) or a QoS requirement for the information.

For example, the first device (100) may selectively apply various embodiments of the present disclosure. For example, when a required QoS level for information to be transmitted by the first device (100) is a specified level or higher, for example, when the required QoS level for the information to be transmitted by the first device (100) is a preset threshold value or greater, blind retransmission considering an allowed delay time may be allowed for the first device (100). For example, when the priority of information to be transmitted by the first device (100) or the priority of a logical channel for transmitting the information is a predetermined priority or higher, blind retransmission considering an allowed delay time may be allowed for the first device (100). In a sidelink, for example, when the PPPP of information to be transmitted by the first device (100) is less than a threshold value, blind retransmission considering an allowed delay time may be allowed for the first device (100).

For example, the first device (100) may differentially apply various embodiments of the present disclosure. For example, required QoS levels for information or priorities of information may be arranged in order and may then be divided into a plurality of groups. Here, for example, earlier or more blind retransmission opportunities according to an allowed delay time may be preferentially assigned to a group having a relatively high required QoS level or a group having a relatively high priority of information. To this end, the first device (100) may adjust the value of Tm (e.g., the margin between a virtual delay deadline and an actual delay deadline) and/or the value of R applied to transmission of information of a group according to the required QoS level of the group or the priority of information. For example, the first device (100) may apply a greater Tm value and/or a greater R value tp a group having a higher required QoS level or a higher priority.

Various embodiments of the present disclosure may also be applied when a deadline for a packet approaches while the first device (100) performs an operation (e.g., a listen-before-talk (LBT) operation) of determining whether a shared channel is idle in order to secure an opportunity to use the channel. For example, it is assumed that the first device (100) has obtained an opportunity to transmit information at a time point of T through an LBT operation. Here, it is assumed that a deadline for information is Td. In this case, various embodiments as follows may be considered.

1) First method: For example, when Td−T is less than a threshold value, the first device (100) may perform transmission and blind retransmission. For example, when Td−T is greater than the threshold value, the first device (100) may perform only the transmission. For example, when the transmission is transmission requiring feedback, the first device (100) may wait for feedback after performing the transmission and may determine whether to perform retransmission according to the feedback.

2) Second method: For example, when Td−T is less than a threshold value, the first device (100) may perform transmission and blind retransmission. For example, as Td−T increases, the first device (100) may increase the number of blind retransmissions. In another example, as Td−T decreases, the first device (100) may increase the number of blind retransmissions.

According to an embodiment of the present disclosure, transmission and retransmission of the same information received from a higher layer by the first device (100) may generally be performed using the same HARQ process. For example, transmission and retransmission of the same information received from the higher layer by a MAC/PHY layer of the first device (100) may generally be performed using the same HARQ process. According to an HARQ scheme, transmission information and retransmission information may include the same redundant bit or different redundancy bits. For example, when the first device (100) performs blind retransmission, the first device (100) may indicate an HARQ process ID used for the retransmission through retransmission-related scheduling information. For example, the second device (200) may determine whether to apply HARQ combining to pieces of data received via different resources with reference to the HARQ process ID and other information (e.g., a new data indicator) transmitted by the first device (100).

According to various embodiments of the present disclosure, the first device (100) may transmit information differently according to time in consideration of a delay requirement for the information. For example, the first device (100) may change a transmission method for a certain time before and after a deadline for transmission of a packet in consideration of a PDB. For example, the first device (100) may change a retransmission method for a packet to be transmitted by the first device (100) according to the remaining time until a delay deadline for the packet. Accordingly, according to various embodiments of the present disclosure, the first device (100) may efficiently perform feedback-based retransmission or blind retransmission according to a delay requirement for information to be transmitted by the first device (100).

Figure 19:
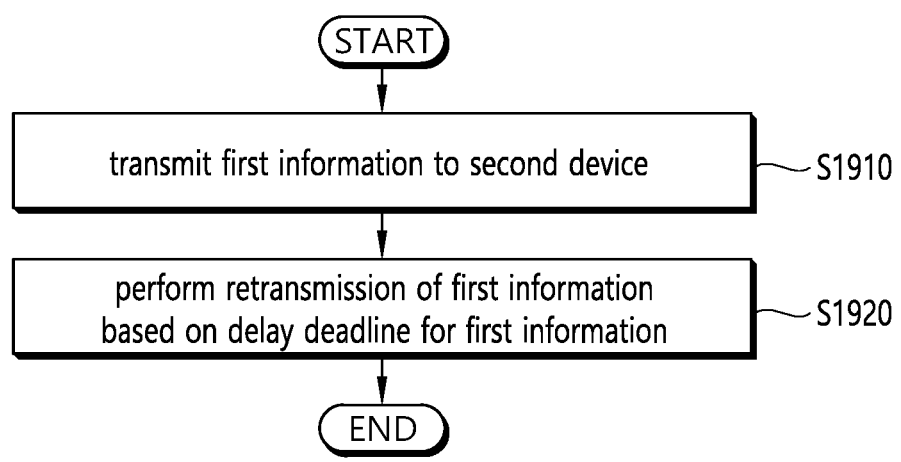
FIG. 19 shows a method for a first device (100) to perform retransmission in accordance with to an embodiment of the present disclosure.

FIG. 19 shows a method for a first device (100) to perform retransmission in accordance with to an embodiment of the present disclosure. The embodiment of FIG. 19 may be combined with various embodiments of the present disclosure.

Referring to FIG. 19, in operation S1910, the first device (100) may transmit first information to a second device (200). For example, the first information may be sidelink information, uplink information, or downlink information. For example, when the first device (100) is a transmitting UE and the second device (200) is a receiving UE, the first information may be slidelink information. For example, when the first device (100) is a UE and the second device (200) is a base station, the first information may be uplink information. For example, when the first device (100) is a base station and the second device (200) is a UE, the first information may be downlink information.

In operation S1920, the first device (100) may perform retransmission of the first information based on a delay deadline for the first information. For example, the retransmission may be blind retransmission. For example, the retransmission may be feedback-based retransmission. For example, the feedback-based retransmission may be the first device (100) performing retransmission of the first information based on feedback information received from the second device (200). For example, the blind retransmission may be the first device (100) performing retransmission to the second device (200) by reducing a code rate compared with that in the previous transmission. For example, when a delay margin is a threshold value or greater, the first device (100) may perform the retransmission to the second device (200) by reducing a redundancy rate, and when the delay margin is the threshold value or less, the first device (100) may perform the retransmission to the second device (200) by increasing the redundancy rate. For example, the blind retransmission may be retransmission of a coded packet to the second device (200) by the first device (100).

Additionally, the first device (100) may determine a first difference value between a time the transmission of the first information is determined and the delay deadline. For example, feedback-based retransmission of the first information may be performed based on the first difference value that is a threshold value or greater. For example, blind retransmission of the first information may be performed based on the first difference value that is the threshold value or less.

Additionally, the first device (100) may determine a second difference value between the time the transmission of the first information is determined and a time the retransmission of the first information is performed based on feedback from the second device. For example, feedback-based retransmission of the first information may be performed based on the second difference value that is less than the first difference value. For example, blind retransmission of the first information may be performed based on the second difference value that is the first difference value or greater.

Additionally, the first device (100) may determine a third difference value between a time the first information is transmitted and the delay deadline. For example, feedback-based retransmission of the first information may be performed based on the third difference value that is a threshold value or greater. For example, blind retransmission of the first information may be performed based on the third difference value that is the threshold value or less.

Additionally, the first device (100) may determine a fourth difference value between the time the first information is transmitted and the time the retransmission of the first information is performed based on the feedback from the second device. For example, feedback-based retransmission of the first information may be performed based on the fourth difference value that is less than the third difference value. For example, blind retransmission of the first information may be performed based on the fourth difference value that is the third difference value or greater.

Additionally, the first device (100) may determine the number of blind retransmissions of the first information based on at least one of a reliability requirement for the first information or a congestion level. For example, the number of blind retransmissions of the first information may increase as the reliability requirement increases or the congestion level increases.

For example, the blind retransmission may be performed only when the first information has a high QoS requirement or a high priority.

Additionally, the first device (100) may transmit control information including scheduling information on the transmission and scheduling information on the retransmission to the second device (200).

The proposed method may be performed by a device according to various embodiments of the present disclosure. First, a processor (102) of a first device (100) may control a transceiver (106) to transmit first information to a second device (200). The processor (102) of the first device (100) may control the transceiver (106) to perform feedback-based retransmission or blind retransmission of the first information based on a delay deadline for the first information.

Various embodiments of the present disclosure may be implemented independently. Alternatively, the various embodiments of the present disclosure may be combined or merged with each other. For example, although the various embodiments of the present disclosure have been described based on a 3GPP system for convenience of description, the various embodiments of the present disclosure can extend to other systems apart from the 3GPP system. For example, the various embodiments of the present disclosure are not limited to direct communication between UEs but may also be used in an uplink or downlink, in which case a base station or a relay node may use the proposed method according to various embodiments of the present disclosure. For example, some of the various embodiments of the present disclosure may be limitedly applied to resource allocation mode 1. For example, some of the various embodiments of the present disclosure may be limitedly applied only to resource allocation mode 2. For example, some of the various embodiments of the present disclosure may be limitedly applied only to preset/signaled (specific) V2X channel/signal transmission (e.g., a PSSCH and/or (linked) PSCCH and/or PSBCH). For example, some of various embodiments of the present disclosure may be limitedly applied only when a PSSCH and a (linked)

PSCCH are adjacently transmitted (in the frequency domain). For example, some of the various embodiments of the present disclosure may be limitedly applied only when a PSSCH and a (linked) PSCCH are non-adjacently transmitted (in the frequency domain). For example, some of the various embodiments of the present disclosure may be limitedly applied only when transmission based on a preset/signaled MCS and/or a coding rate and/or an RB value/range is performed. For example, some of the various embodiments of the present disclosure may be (limitedly) applied only when carriers have the same (and/or (partially) different) positions and/or number of synchronization signal (transmission and/or reception) resources (and/or positions and/or number of V2X resource pool-related subframes (and/or size and/or number of subchannels)). For example, some of the various embodiments of the present disclosure may also be applied in an extended manner to (V2X) communication between a base station and a UE. For example, some of the various embodiments of the present disclosure may be limitedly applied to only at least one of unicast (sidelink) communication, groupcast (sidelink) communication, and/or broadcast (sidelink) communication.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
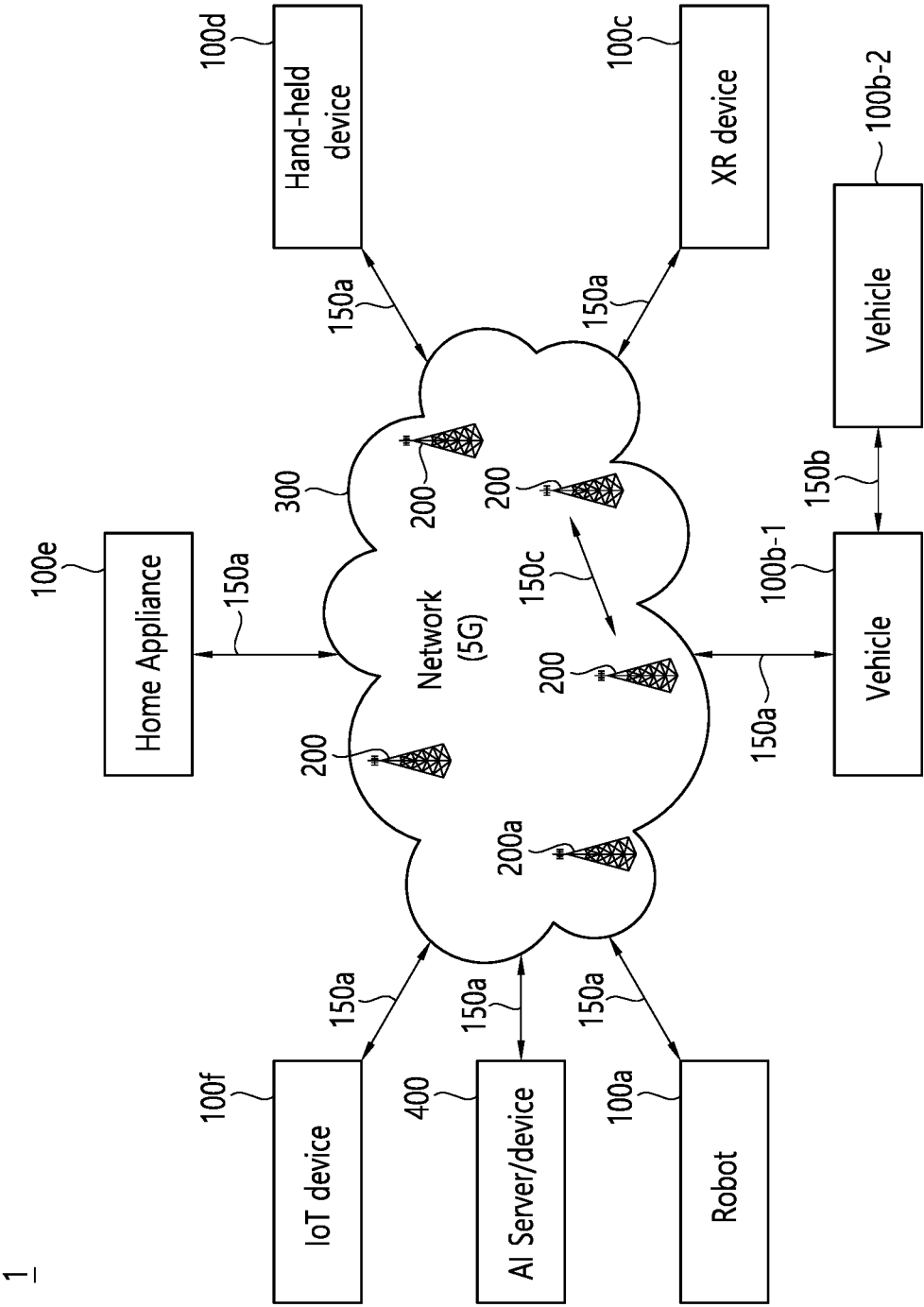
FIG. 20 shows a communication system (1) in accordance with an embodiment of the present disclosure.

FIG. 20 shows a communication system (1) in accordance with an embodiment of the present disclosure.

Referring to FIG. 20, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
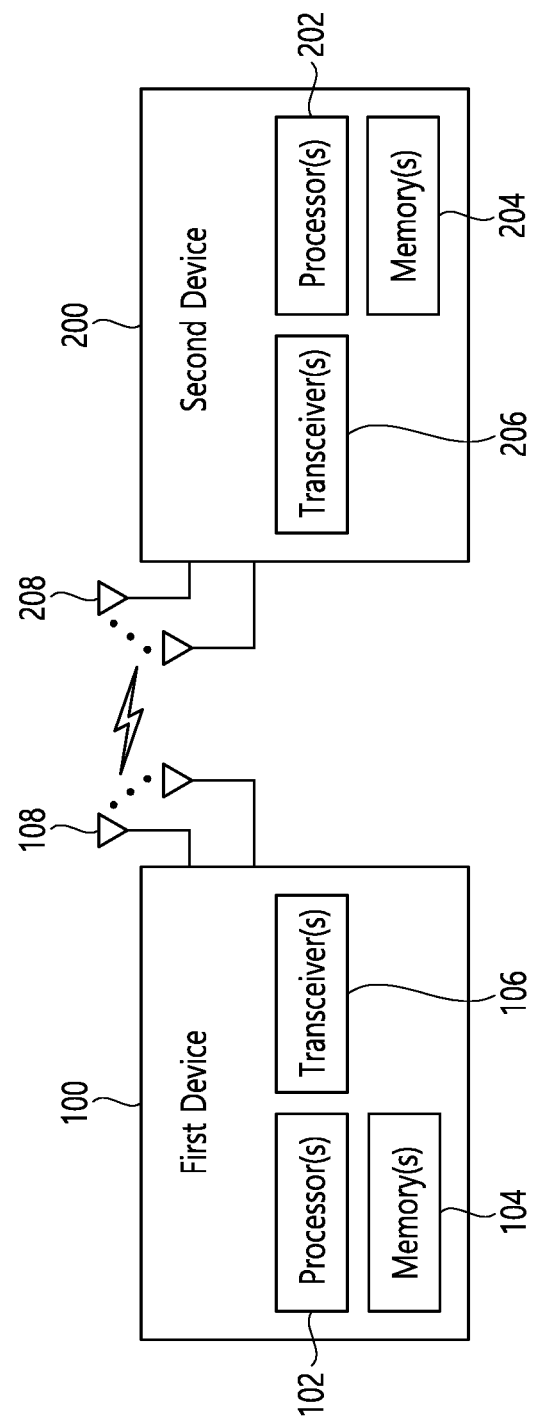
FIG. 21 shows wireless devices in accordance with an embodiment of the present disclosure.

FIG. 21 shows wireless devices in accordance with an embodiment of the present disclosure.

Referring to FIG. 21, a first wireless device (100) and a second wireless device (200) may transmit radio signals through various RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 20.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 22:
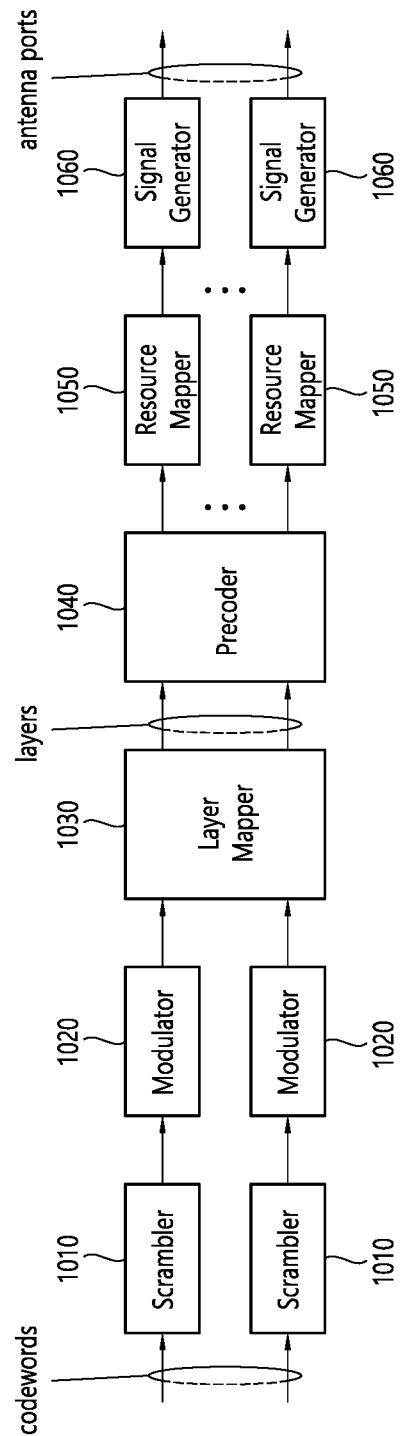
FIG. 22 shows a signal process circuit for a transmission signal in accordance with an embodiment of the present disclosure.

FIG. 22 shows a signal process circuit for a transmission signal in accordance with an embodiment of the present disclosure.

Referring to FIG. 22, a signal processing circuit (1000) may include scramblers (1010), modulators (1020), a layer mapper (1030), a precoder (1040), resource mappers (1050), and signal generators (1060). An operation/function of FIG. 22 may be performed, without being limited to, the processors (102, 202) and/or the transceivers (106, 206) of FIG. 21. Hardware elements of FIG. 22 may be implemented by the processors (102, 202) and/or the transceivers (106, 206) of FIG. 21. For example, blocks 1010~1060 may be implemented by the processors (102, 202) of FIG. 21. Alternatively, the blocks 1010~1050 may be implemented by the processors (102, 202) of FIG. 21 and the block 1060 may be implemented by the transceivers (106, 206) of FIG. 21.

Codewords may be converted into radio signals via the signal processing circuit (1000) of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 22. For example, the wireless devices (e.g., 100, 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
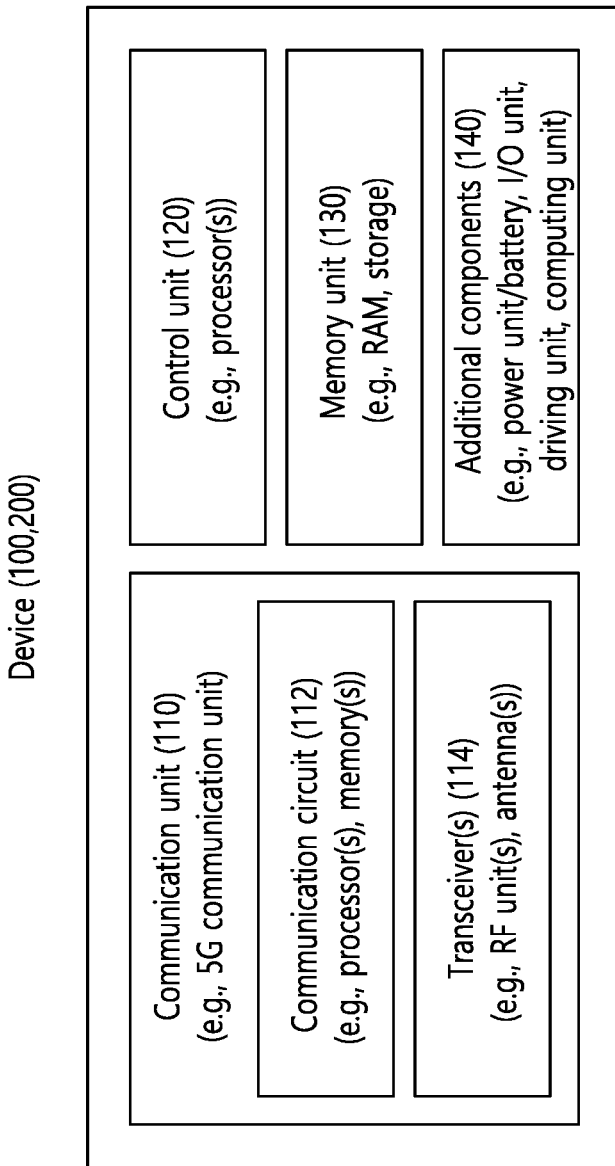
FIG. 23 shows another example of a wireless device in accordance with an embodiment of the present disclosure.

FIG. 23 shows another example of a wireless device in accordance with an embodiment of the present disclosure. The wireless device may be implemented in various forms according to a use-case/service (refer to FIG. 20).

Referring to FIG. 23, wireless devices (100, 200) may correspond to the wireless devices (100, 200) of FIG. 21 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 21. For example, the transceiver(s) (114) may include the one or more transceivers (106, 206) and/or the one or more antennas (108, 208) of FIG. 21. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
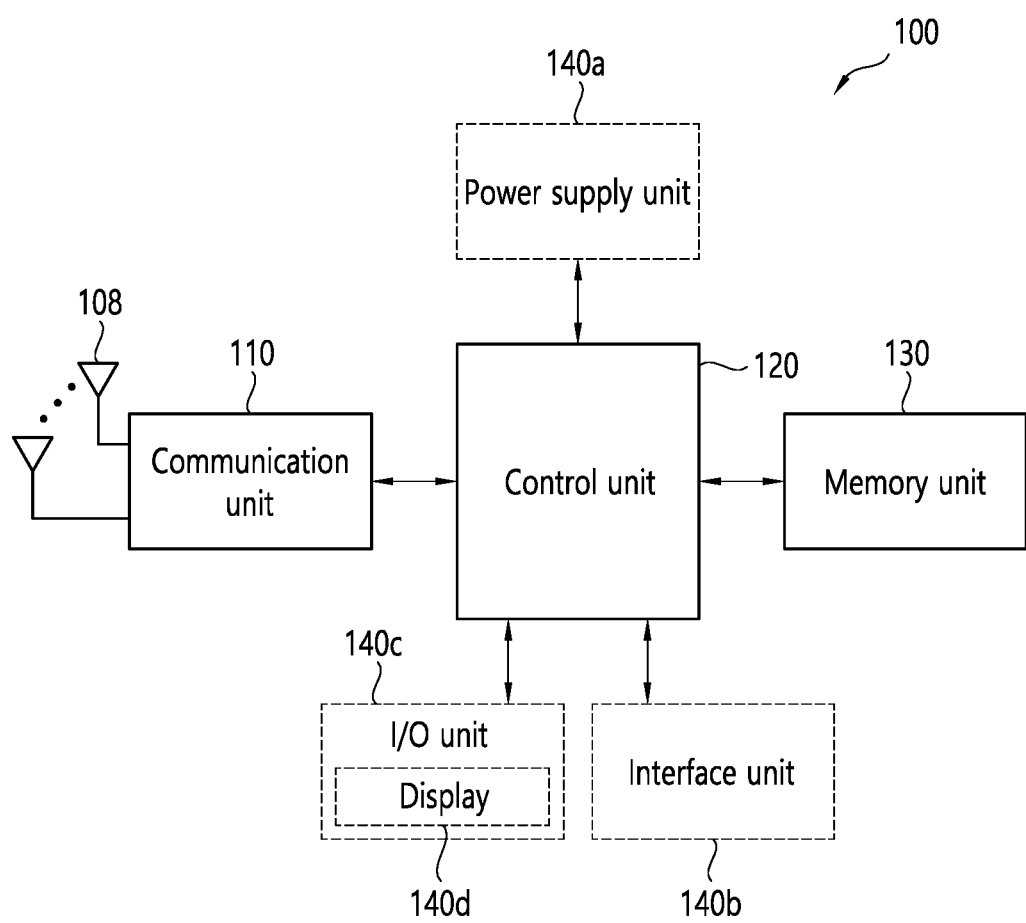
FIG. 24 shows a hand-held device in accordance with an embodiment of the present disclosure.

FIG. 24 shows a hand-held device in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 23, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, etc. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 25:
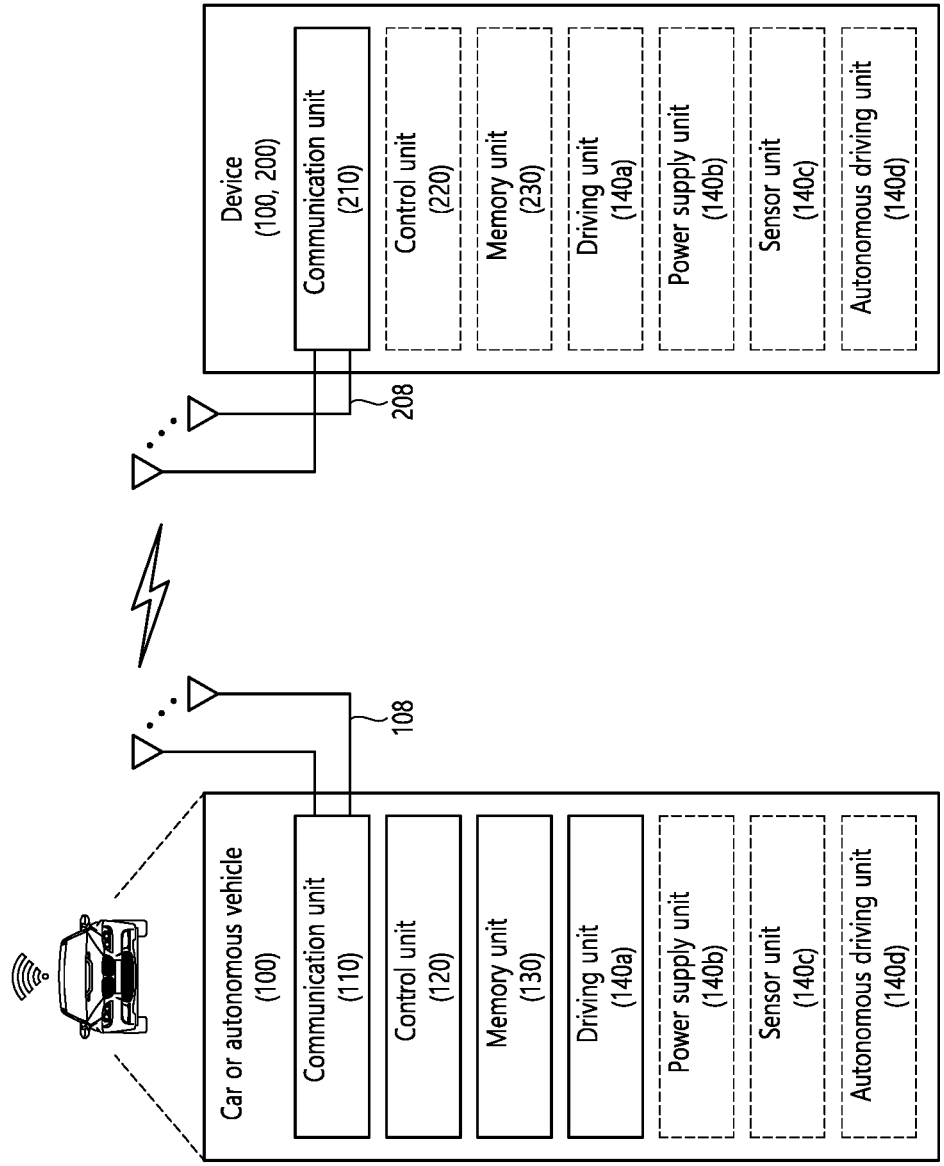
FIG. 25 shows a vehicle or an autonomous vehicle in accordance with an embodiment of the present disclosure.

FIG. 25 shows a vehicle or an autonomous vehicle in accordance with an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 23, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, etc. The power supply unit (140b) may supply power to the vehicle or the autonomous vehicle (100) and include a wired/wireless charging circuit, a battery, etc. The sensor unit (140c) may obtain a vehicle state, ambient environment information, user information, etc. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 26:
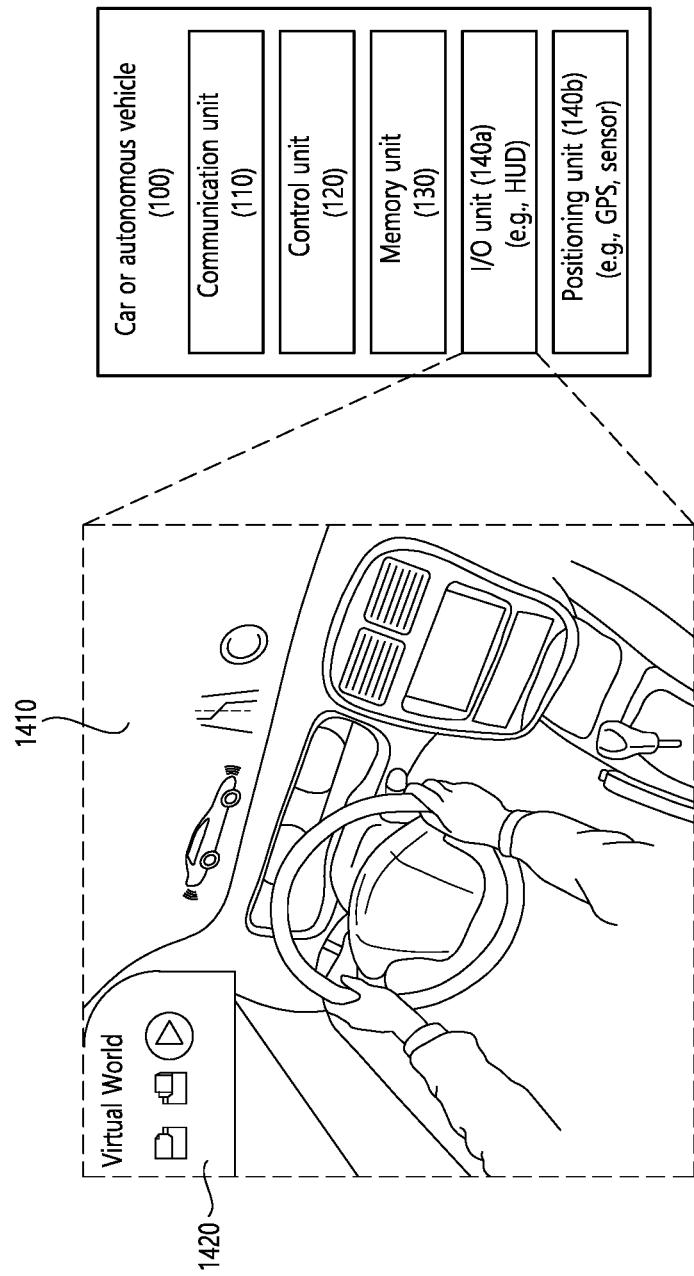
FIG. 26 shows a vehicle in accordance with an embodiment of the present disclosure.

FIG. 26 shows a vehicle in accordance with an embodiment of the present disclosure. The vehicle may be implemented as a transport means, an aerial vehicle, a ship, etc.

Referring to FIG. 26, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 23.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormality to neighboring vehicles through the communication unit (110). According to situation, the control unit (120) may transmit the vehicle position information and the information on driving/vehicle abnormality to related organizations.

Figure 27:
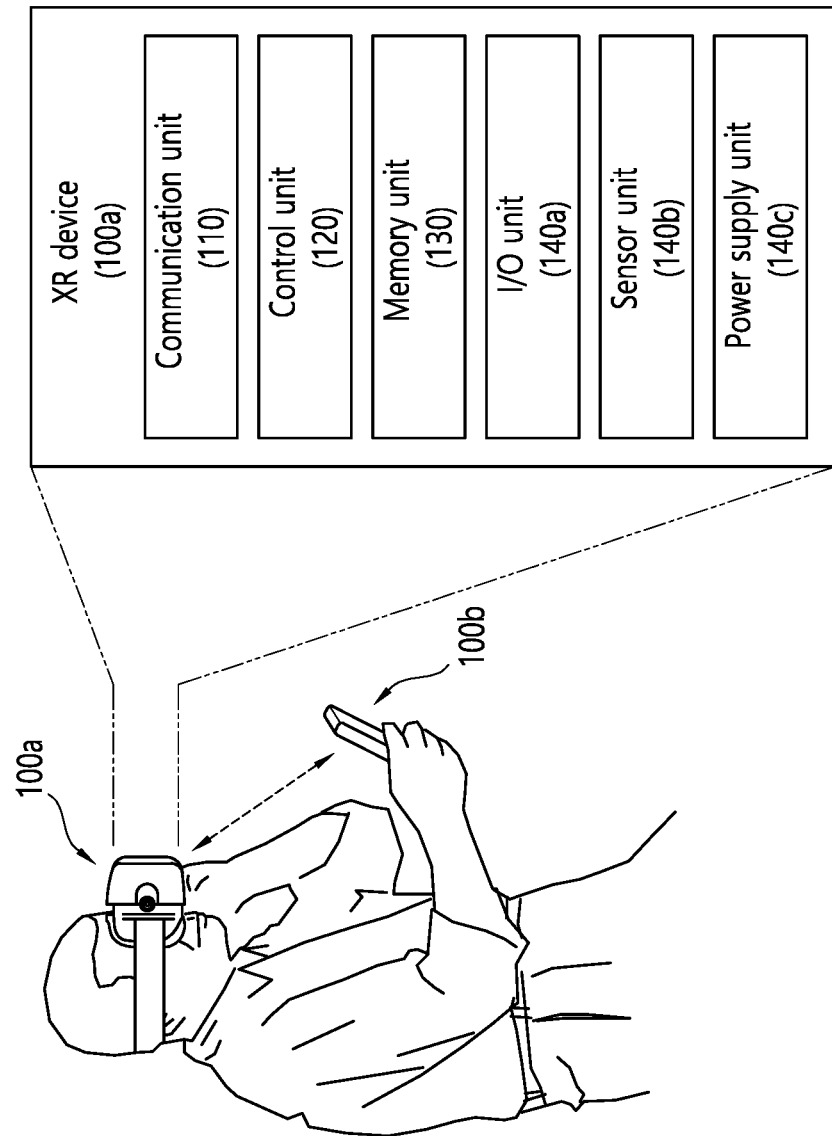
FIG. 27 shows an XR device in accordance with an embodiment of the present disclosure.

FIG. 27 shows an XR device in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 27, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 23, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, etc. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, etc.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device (100b)) or a media server through the communication unit (130). The communication unit (130) may download/stream content such as films or news from another device (e.g., the hand-held device (100b)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 28:
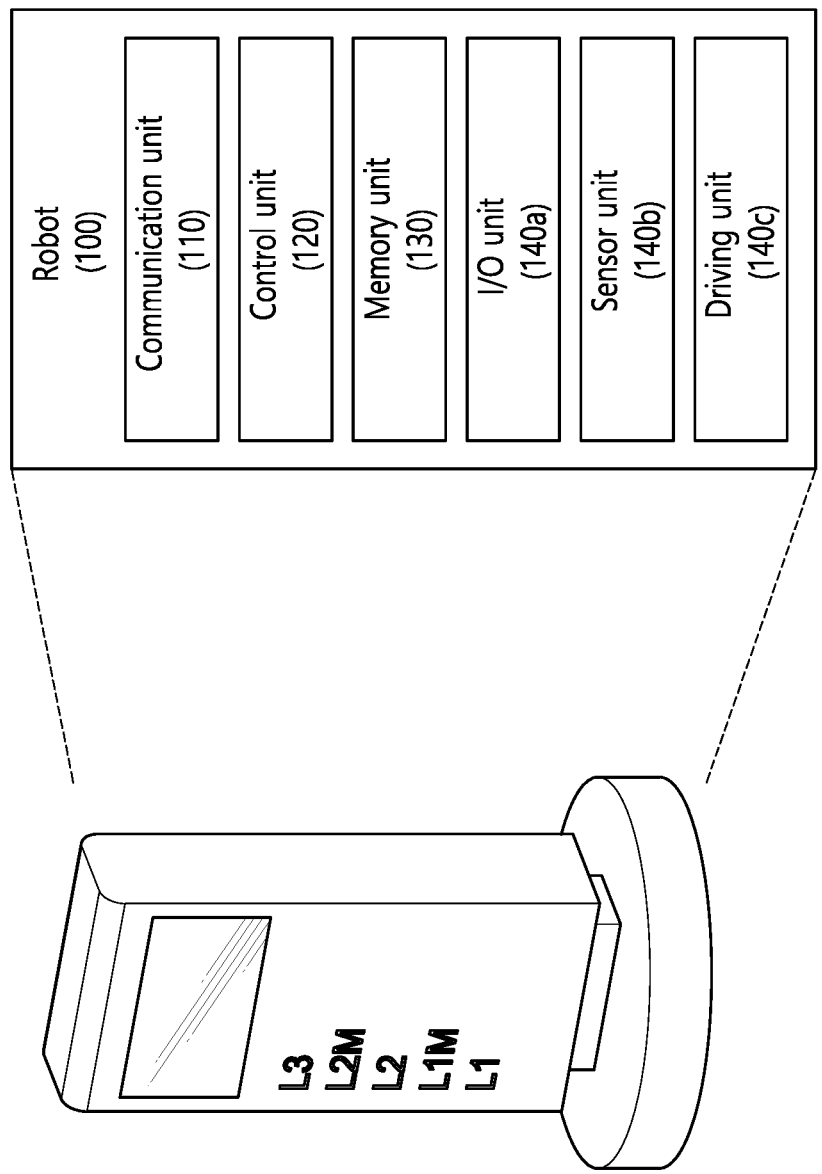
FIG. 28 shows a robot in accordance with an embodiment of the present disclosure.

FIG. 28 shows a robot in accordance with an embodiment of the present disclosure. The robot may be categorized into an industrial robot, a medical robot, a household robot, a military robot, etc., according to a used purpose or field.

Referring to FIG. 28, a robot (100) may include a communication unit (110), a control unit (120), a memory unit (130), an I/O unit (140*a*), a sensor unit (140*b*), and a driving unit (140*c*). Herein, the blocks 110~130/140*a*~140*c* correspond to the blocks 110~130/140 of FIG. 23, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140*a*) may obtain information from the exterior of the robot (100) and output information to the exterior of the robot (100). The I/O unit (140*a*) may include a camera, a microphone, a user input unit, a display unit, a speaker, and/or a haptic module. The sensor unit (140*b*) may obtain internal information of the robot (100), surrounding environment information, user information, etc. The sensor unit (140*b*) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140*c*) may perform various physical operations such as movement of robot joints. In addition, the driving unit (140*c*) may cause the robot (100) to travel on the road or to fly. The driving unit (140*c*) may include an actuator, a motor, a wheel, a brake, a propeller, etc.

Figure 29:
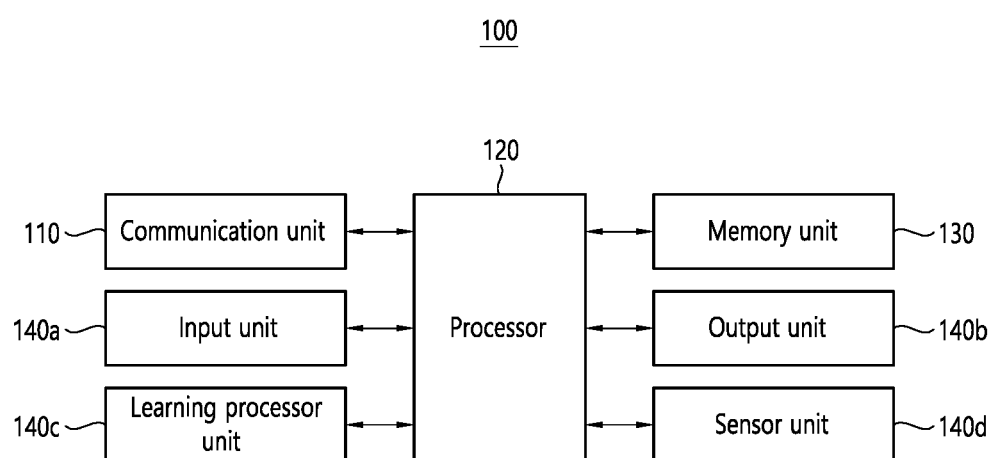
FIG. 29 shows an AI device in accordance with an embodiment of the present disclosure.

FIG. 29 shows an AI device in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 29, an AI device (100) may include a communication unit (110), a control unit (120), a memory unit (130), an I/O unit (140*a*/140*b*), a learning processor unit (140*c*), and a sensor unit (140*d*). The blocks 110~130/140*a*~140*d* correspond to blocks 110~130/140 of FIG. 23, respectively.

The communication unit (110) may transmit and receive wired/radio signals (e.g., sensor information, user input, learning models, or control signals) to and from external devices such as other AI devices (e.g., 100*x*, 200, or 400 of FIG. 20) or an AI server (e.g., 400 of FIG. 20) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140*c*) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140*c*) or transmit the collected information to an external device such as an AI server (400 of FIG. 20). The collected history information may be used to update a learning model.

The memory unit (130) may store data for supporting various functions of the AI device (100). For example, the memory unit (130) may store data obtained from the input unit (140*a*), data obtained from the communication unit (110), output data of the learning processor unit (140*c*), and data obtained from the sensor unit (140). The memory unit (130) may store control information and/or software code needed to operate/drive the control unit (120).

The input unit (140*a*) may obtain various types of data from the exterior of the AI device (100). For example, the input unit (140*a*) may obtain learning data for model learning, and input data to which the learning model is to be applied. The input unit (140*a*) may include a camera, a microphone, and/or a user input unit. The output unit (140*b*) may generate output related to a visual, auditory, or tactile sense. The output unit (140*b*) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140*c*) may learn a model consisting of artificial neural networks, using learning data. The learning processor unit (140*c*) may perform AI processing together with the learning processor unit of the AI server (400 of FIG. 20). The learning processor unit (140*c*) may process information received from an external device through the communication unit (110) and/or information stored in the memory unit (130). In addition, an output value of the learning processor unit (140*c*) may be transmitted to the external device through the communication unit (110) and may be stored in the memory unit (130).

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:

obtaining medium access control (MAC) packet data unit (PDU) for which HARQ (hybrid automatic repeat request) feedback is enabled;

performing transmission of the MAC PDU to a second device; and determining a remaining packet delay budget (PDB) of the MAC PDU, wherein the remaining PDB of the MAC PDU is a first difference value between a first time when the first device obtains the MAC PDU and a second time of a delay deadline for the MAC PDU, configuring the MAC PDU for which the HARQ feedback is disabled, based on the remaining PDB of the MAC PDU being less than or equal to a threshold;

performing retransmission of the MAC PDU based on the remaining PDB of the MAC PDU being less than or equal to the threshold, wherein the retransmission of the MAC PDU is a blind retransmission, wherein the retransmission of the MAC PDU includes a HARQ retransmission of the MAC PDU, and wherein the HARQ retransmission of the MAC PDU is performed by a medium access control (MAC) layer of the first device.

2. The method of claim 1, wherein the MAC PDU is sidelink information, uplink information, or downlink information.

3. The method of claim 1, further comprising:

determining a number of the blind retransmissions of the MAC PDU based on at least one of a reliability requirement for the MAC PDU or a congestion level.

4. The method of claim 3, wherein the number of the blind retransmissions of the MAC PDU increases as the reliability requirement increases or the congestion level increases.

5. The method of claim 3, wherein the blind retransmissions are performed only when the MAC PDU has a high QoS requirement or a high priority.

6. The method of claim 1, further comprising:

transmitting control information comprising scheduling information on the transmission and scheduling information on the retransmission to the second device.

7. A first device for performing wireless communication, the first device comprising:

at least one memory;

at least one transceiver; and at least one processor to couple the at least one memory and the at least one transceiver, wherein the processor is configured to control the transceiver to:

obtain medium access control (MAC) packet data unit (PDU) for which HARQ (hybrid automatic repeat request) feedback is enabled;

perform transmission of the MAC PDU to the second device, determine a remaining packet data budget (PDB) of the MAC PDU, wherein the remaining PDB of the MAC PDU is a first difference value between a first time when the first device obtains the MAC PDU and a second time of a delay deadline for the MAC PDU, configure the MAC PDU for which the HARQ feedback is disabled, based on the remaining PDB of the MAC PDU being less than or equal to a threshold, and perform retransmission of the MAC PDU based on the remaining PDB of the MAC PDU being less than or equal to a threshold, wherein the retransmission of the MAC PDU is a blind retransmission, wherein the retransmission of the MAC PDU includes HARQ retransmission of the MAC PDU, and wherein the HARQ retransmission of the MAC PDU is performed by a medium access control (MAC) layer of the first device.

8. The first device of claim 7, wherein the MAC PDU is sidelink information, uplink information, or downlink information.

* * * * *